(12) United States Patent
Shnurenko et al.

(10) Patent No.: US 10,839,063 B2
(45) Date of Patent: Nov. 17, 2020

(54) METHOD, APPARATUS, AND SYSTEM FOR PROVIDING TEMPORARY ACCOUNT INFORMATION

(71) Applicant: Samsung Electronics Co., Ltd., Suwon-si (KR)

(72) Inventors: Igor Shnurenko, Kharkov (UA); Yevhenii Yakishyn, Kyiv (UA); Jae-hong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/781,417

(22) PCT Filed: Oct. 7, 2016

(86) PCT No.: PCT/KR2016/011229
§ 371 (c)(1),
(2) Date: Jun. 4, 2018

(87) PCT Pub. No.: WO2017/099342
PCT Pub. Date: Jun. 15, 2017

(65) Prior Publication Data
US 2018/0357403 A1    Dec. 13, 2018

(30) Foreign Application Priority Data

Dec. 7, 2015  (KR) .................... 10-2015-0173301

(51) Int. Cl.
*G06F 7/04* (2006.01)
*H04N 7/16* (2011.01)
(Continued)

(52) U.S. Cl.
CPC .............. *G06F 21/34* (2013.01); *G06F 21/32* (2013.01); *G06F 21/41* (2013.01); *H04L 9/3228* (2013.01);
(Continued)

(58) Field of Classification Search
USPC ............................................ 726/6
See application file for complete search history.

(56) References Cited

U.S. PATENT DOCUMENTS 8,230,231 B2   7/2012  Freeman et al.
8,695,067 B2   4/2014  Kim et al.
(Continued)

FOREIGN PATENT DOCUMENTS

KR   10-2010-0021818 A   2/2010

OTHER PUBLICATIONS

European Search Report dated Aug. 21, 2018 in European Application No. 16873208.9.
(Continued)

*Primary Examiner* — Wasika Nipa
*Assistant Examiner* — Samuel Ambaye
(74) *Attorney, Agent, or Firm* — Jefferson IP Law, LLP

(57) ABSTRACT

Provided is a method of providing, by a server, account information, the method including: receiving an account generation request message from a first device; generating first account information, based on user identification information included in the account generation request message; transmitting the generated first account information to the first device; receiving an account use request message from a second device; identifying the first account information and service identification information included in the received account use request message; and transmitting second account information corresponding to the identified first account information and the service identification information, to the second device.

9 Claims, 20 Drawing Sheets

(51) Int. Cl.
*G06F 21/34* (2013.01)
*G06F 21/32* (2013.01)
*G06F 21/41* (2013.01)
*H04L 9/32* (2006.01)
*H04L 29/06* (2006.01)
*H04W 12/06* (2009.01)
*H04W 4/80* (2018.01)

(52) U.S. Cl.
CPC .......... *H04L 9/3231* (2013.01); *H04L 9/3234* (2013.01); *H04L 9/3297* (2013.01); *H04L 63/0815* (2013.01); *H04W 12/0608* (2019.01); *G06F 2221/2117* (2013.01); *G06F 2221/2137* (2013.01); *H04L 63/0838* (2013.01); *H04L 63/0861* (2013.01); *H04W 4/80* (2018.02)

(56) References Cited

U.S. PATENT DOCUMENTS

| | | | |
|---|---|---|---|
| 8,763,097 B2 | 6/2014 | Bhatnagar et al. | |
| 9,021,562 B1* | 4/2015 | Buckingham | G06F 21/31 726/5 |
| 2003/0172090 A1 | 9/2003 | Asunmaa et al. | |
| 2007/0079135 A1 | 4/2007 | Saito | |
| 2009/0222656 A1 | 9/2009 | Rouskov et al. | |
| 2010/0042847 A1* | 2/2010 | Jung | G06F 21/43 713/183 |
| 2011/0307939 A1* | 12/2011 | Okashita | G06F 21/6263 726/3 |
| 2013/0086644 A1* | 4/2013 | Bahn | H04L 12/2818 726/4 |
| 2013/0174244 A1 | 7/2013 | Taveau et al. | |
| 2014/0213180 A1* | 7/2014 | Cha | H04N 21/84 455/41.1 |
| 2014/0282962 A1 | 9/2014 | Harrison | |

OTHER PUBLICATIONS

SoC and CPU System-Wide Approach to Security, https://www.arm.com/products/security-on-arm/trustzone (1995-2018).
Simpler, Stronger Authentication, https://fidoalliance.org (2018).

* cited by examiner

FIG. 5

| SERVICE ACCOUNT INFORMATION SET | | | 501 |
|---|---|---|---|
| Service Provider | ID | PW | |
| Google | Samsung_1 | Galaxy_1 | |
| Facebook | Samsung_2 | Galaxy_2 | |
| Twitter | Samsung_3 | Galaxy_3 | |
| Amazon | Samsung_4 | Galaxy_4 | |
| Ebay | Samsung_5 | Galaxy_5 | |

| TEMPORARY ACCOUNT INFORMATION | | 503 |
|---|---|---|
| ID | 579mx#919j | |
| PW | mk10!332g | |

METHOD, APPARATUS, AND SYSTEM FOR PROVIDING TEMPORARY ACCOUNT INFORMATION

TECHNICAL FIELD

The present disclosure relates to a service method and apparatus for providing account information of a user.

BACKGROUND ART

Recently, with the development of communication technology and enhancement of device performance, the numbers and types of online services have rapidly increased. With the rapid increase in the number and types of online services, the necessity of managing accounts of users and maintaining security has also increased.

In the past, a user had to remember information about each of accounts required to use a plurality of online services. The user may use the plurality of online services, such as Google, Facebook, and Twitter, but in order to use each of the services, such as Google, Facebook, and Twitter, the user has to remember all of an identifier (ID) and a password for Google, an ID and a password for Facebook, and an ID and a password for Twitter. In other words, as the number of online services used by the user increases, the number of accounts to be remembered by the user also increases, and thus it is inconvenient to manage the accounts.

Also, in the past, when account information is input to use an online service in a public place, such as an airport or a school, there is a possibility that a security issue may arise, for example, the input account information may be leaked and thus an account of a user may be compromised. When the user inputs an ID and a password to a computer provided in a public place, such as an airport, to use an online service, the input ID and password may be leaked through a hacking program or the like, and the user may be harmed.

Accordingly, the necessity for simple methods of managing and providing a user account while maintaining security is becoming increasingly important.

DESCRIPTION OF EMBODIMENTS

Technical Problem

Provided are simple methods of managing and providing a user account while maintaining security.

Solution to Problem

According to an aspect of the present disclosure, separate account information for using a service may be issued as needed, when the service using a user account is provided.

Advantageous Effects of Disclosure

The present disclosure provides a convenient service access method while maintaining security, when a service using a user account is provided.

BRIEF DESCRIPTION OF DRAWINGS

FIG. 5 is a diagram for describing a method of storing registered service account information and temporary account information, according to some embodiments.

BEST MODE

Figure 1:
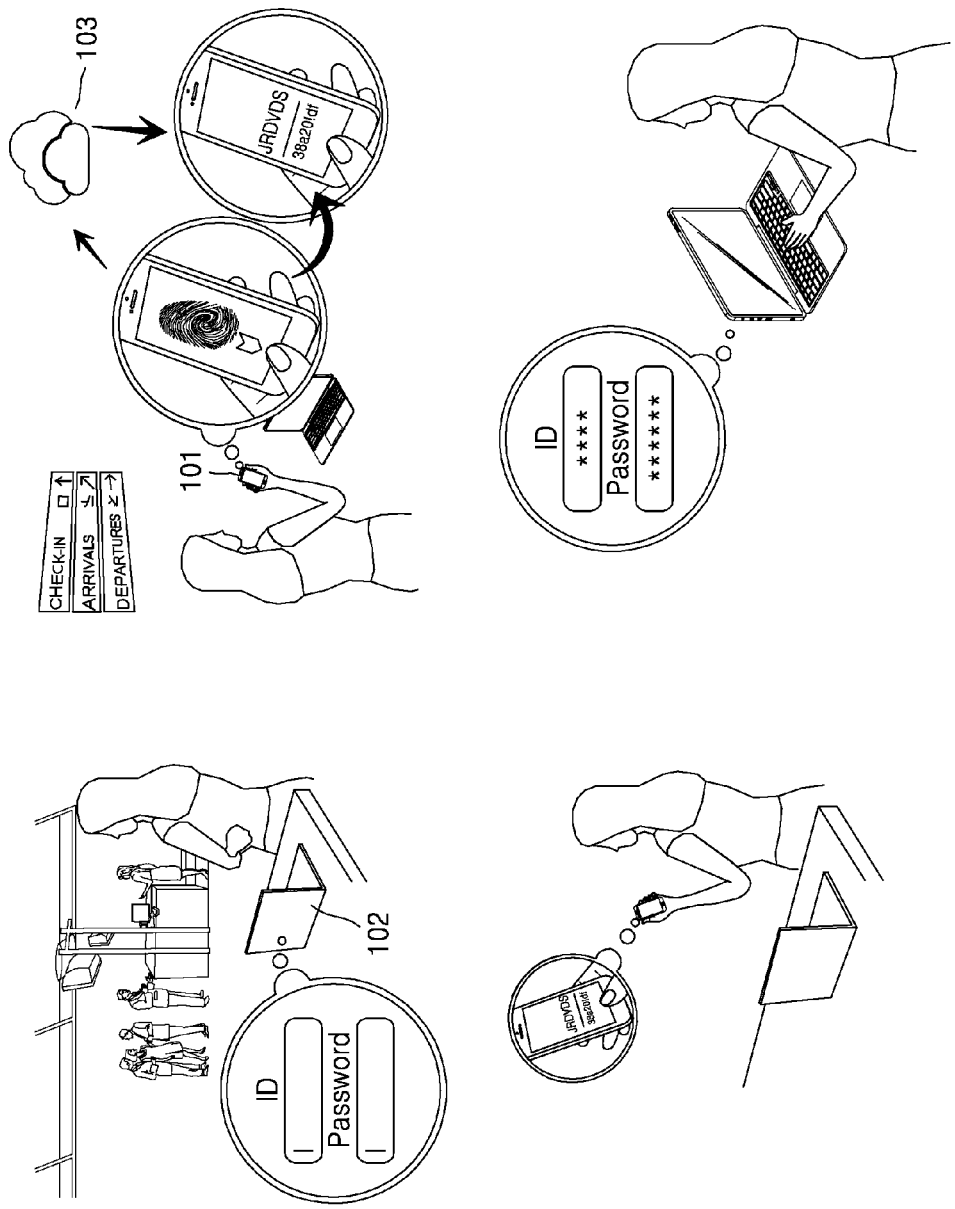
FIG. 1 is a diagram for describing an online service providing method using account information, according to some embodiments.

In accordance with an aspect of the disclosure, includes a method of providing, by a server, account information, the method including: receiving an account generation request message from a first device; generating first account information, based on user identification information included in the account generation request message; transmitting the generated first account information to the first device; receiving an account use request message from a second device; identifying the first account information and service identification information included in the received account use request message; and transmitting second account information corresponding to the identified first account information and the service identification information, to the second device.

The user identification information includes biometric information usable for user identification.

A length of the first account information is determined based on a type of the user identification information.

The second account information corresponds to account information of a user registered in the second device.

The generating of the first account information includes: authenticating a user, based on the user identification information; and generating the first account information, based on a result of the authenticating.

The account information of the user registered in the second device includes at least one of an identifier and a password for using a service provided by the second device, and a unique identifier used by the second device to identify a certain user.

The method further includes: obtaining the second account information; and storing the obtained second account information, wherein the transmitting of the second account information includes transmitting the stored second account information The transmitting of the second account information includes: transmitting an account use confirmation request message to the first device, based on the received account use request message; receiving an account use confirmation response message from the first device; and selectively transmitting the second account information to the second device, based on the account use confirmation response message.

The method further includes deleting the generated first account information when a certain time has passed, or based on the number of times the account use request message is received from the second device.

The generating of the first account information may include: determining a length of the first account information to be generated; generating a random number corresponding to the determined length; when converting the generated random number to a character string by using an ASCII code, determining whether the character string includes a character string unrecognizable by a user; and generating the first account information by using the generated random number, based on a result of the determining.

The obtaining of the second account information includes: receiving an account information register request message from the first device; and obtaining at least one piece of second account information corresponding to at least one service, based on at least one piece of account information included in the account information register request message, wherein the storing of the second account information comprises storing the at least one piece of second account information as one group.

In accordance with another aspect of the disclosure, a method of providing, by a first device, account information, the method including: obtaining user authentication information; obtaining user identification information, based on the obtained user authentication information; transmitting an account generation request message including the user identification information, to a server; receiving first account information that is temporary account information generated by the server; and providing the received first account information.

The providing includes transmitting the received first account information to a third device by using short-range wireless communication.

The user authentication information includes at least one of biometric information, a password, and lock pattern information.

The user identification information may include biometric information, personal identification number (PIN) information, transaction information, identification information of the first device, and account information of the authenticated user pre-registered in the server.

In accordance with another aspect of the disclosure, includes a non-transitory computer-readable recording medium having recorded thereon a program which, when executed by a computer, performs the method of claim 1.

In accordance with another aspect of the disclosure, includes a server for providing account information, the server including: a controller configured to generate first account information, based on user identification information, and identify the first account information and service identification information included in an account use request message received from a second device; a communication unit configured to receive an account generation request message from a first device, transmit the generated first account information to the first device, receive an account use request message from the second device, and transmit second account information corresponding to the received first account information and service identification information, to the second device; and a storage unit configured to store the generated first account information.

The user identification information includes biometric information usable for user identification.

A length of the first account information is determined based on a type of the user identification information.

The second account information corresponds to account information of a user registered in the second device.

The controller may be further configured to authenticate the user based on the user identification information, and generate the first account information based on a result of the authentication.

The account information of the user registered in the second device includes at least one of an identifier and a password for using a service provided by the second device, and a unique identifier used by the second device to identify a certain user.

The communication unit may be further configured to obtain the second account information and transmit the obtained second account information, and the storage unit may be further configured to store the obtained second account information.

The communication unit may be further configured to transmit an account use confirmation request message to the first device, based on the received account use request message, and receive an account use confirmation response message from the first device, and the controller may be further configured to selectively transmit the second account information to the second device, based on the account use confirmation response message.

The controller may be further configured to delete the generated first account information when a certain time has passed, or based on the number of times the account use request message is received from the second device.

The controller may be further configured to determine a length of the first account information to be generated, generate a random number corresponding to the determined length, when converting the generated random number to a character string by using an ASCII code, determine whether the character string includes a character string unrecognizable by a user, and generate the first account information by using the generated random number, based on a result of the determination.

The communication unit may be further configured to receive an account information register request message from the first device, and obtain at least one piece of second account information corresponding to at least one service, based on at least one piece of account information included in the account information register request message, and the storage unit may be further configured to store the at least one piece of second account information as one group.

In accordance with another aspect of the disclosure, a first device for providing account information, the first device includes: a user interface configured to obtain user authentication information; a controller configured to obtain user identification information, based on the obtained user authentication information; and a communication unit configured to transmit an account generation request message including the user identification information to a server, receive first account information, that is temporary account information generated by the server, and provide the received first account information.

The communication unit may be further configured to transmit the received first account information to a third device via short-range wireless communication.

The user authentication information may include at least one of biometric information, a password, and lock pattern information.

The user identification information may include biometric information, personal identification number (PIN) information, transaction information, identification information of the first device, and account information of an authenticated user pre-registered in the server.

Mode of Disclosure

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

In the specification, when a region is "connected" to another region, the regions may not only be "directly connected", but may also be "electrically connected" via another device therebetween. Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

In the present disclosure, an online service denotes a service provided through a communication network, and incudes a service provided by using an online system in which devices are connected to each other through a communication wire to transmit and receive data. The online service may include various services, such as an electronic mail service, a chatting service, a bulletin board service, and an information searching service, but is not limited thereto. Also, the online service may be provided through a program installed in a device, such as a web browser, an application, or the like, but is not limited thereto.

In the present disclosure, account information is information used by a service provider to identify a service subscriber and provide a service, and for example, may include an identifier (ID), a password, a personal identification number (PIN) code, a unique identifier (UID), or the like, but is not limited thereto. In the present specification, account information may include temporary account information and service account information, but is not limited thereto.

In the present disclosure, service account information may include account information used for use of a service, but is not limited thereto.

In the present disclosure, temporary account information is account information different from account information of a user registered in a service server, and may include account information set such that a service is used only a certain number of times or only for a certain period of time.

In the present disclosure, examples of a device may include devices, such as a personal computer, a cellular phone, a smart phone, a television (TV), a tablet computer, a laptop computer, a personal digital assistant (PDA), a portable multimedia player (PMP), a navigation device, an MP3 player, a digital camera, etc., but are not limited thereto and may include various devices.

In the present specification, examples of a server may include a single server, a set of servers, a cloud server, etc., but are not limited thereto. Also, examples of the server may include an account server managing an account, and a service server (a server of a service provider).

In the present specification, a short-range communication method may denote a communication method in which two devices are communicable only when they are within a certain range, and for example, may include a Bluetooth communication method, a near field communication (NFC) method, a ZigBee communication method, a Bluetooth low energy (BLE) communication method, a Zig-Wave communication method, a Wi-Fi communication method, and a radio frequency identification (RFID) communication method, but is not limited thereto.

In the present specification, a mobile communication method may denote a communication method in which two devices are communicable regardless of a distance, such as a remote distance communication method, and may include a short-message service (SMS) communication method, and a communication method using a cellular network (a third-generation (3G) or 4G (long-term evolution (LTE) network), but is not limited thereto.

In the present specification, a random number may denote an arbitrary value added to a value input to a function so as to vary a value output through the function, but is not limited thereto.

FIG. 1 is a diagram for describing an online service providing method using account information, according to some embodiments.

Referring to FIG. 1, a user wishes to use an online service by using a service using device 102. According to some embodiments, the service using device 102 is a device that is not a user terminal, and may include a device having a certain level of reliability or lower. For the user to use the online service, the user has to input certain account information, such as an ID and a password registered in a service server to be used, into the service using device 102. For example, in order to use a Facebook service, the user has to input an ID and a password of the user registered in the Facebook service, into a device for using the Facebook service.

Here, the service using device 102 may be a device provided in a public place, and highly likely to be unsecured. For example, a hacking program may be installed in the service using device 102, or the service using device 102 may use an unsecured communication wire during communication with a service server. In other words, the service using device 102 may be a device whose reliability is lower than a certain standard, and thus, the user may not wish to input service account information (for example, an ID and a password) of the user registered in a service server due to risks, such as leakage of account information, security issues, etc.

According to some embodiments, the user may be issued temporary account information by using a user terminal 101 to maintain security while accessing a service through the service using device 102. According to some embodiments, the user terminal 101 may include a device having reliability higher than the certain standard.

According to some embodiments, the user terminal 101 may receive user authentication information from the user and identify the user based on the user authentication information. For example, the user terminal 101 may authenticate the user by receiving fingerprint information from the user, and identify the user. The user terminal 101 may request an account server 103 to generate temporary account information, based on user identification information.

According to some embodiments, the account server 103 may generate temporary account information, and provide the generated temporary account information to the user terminal 101. The user terminal 101 may provide the received temporary account information to the service using device 102. For example, the user terminal 101 may output temporary account information for the user to input the received temporary account information to the service using device 102, or the user terminal 101 may directly transmit the temporary account information to the service using device 102 by using any one of various communication methods, such as a short-range wireless communication method and a mobile communication method.

According to some embodiments, the service using device 102 requests the service server for use of a service by using the input temporary account information such that the user may use an online service. A method of using a service through temporary account information will be described in detail with reference to an entire system of FIG. 2.

Figure 2:
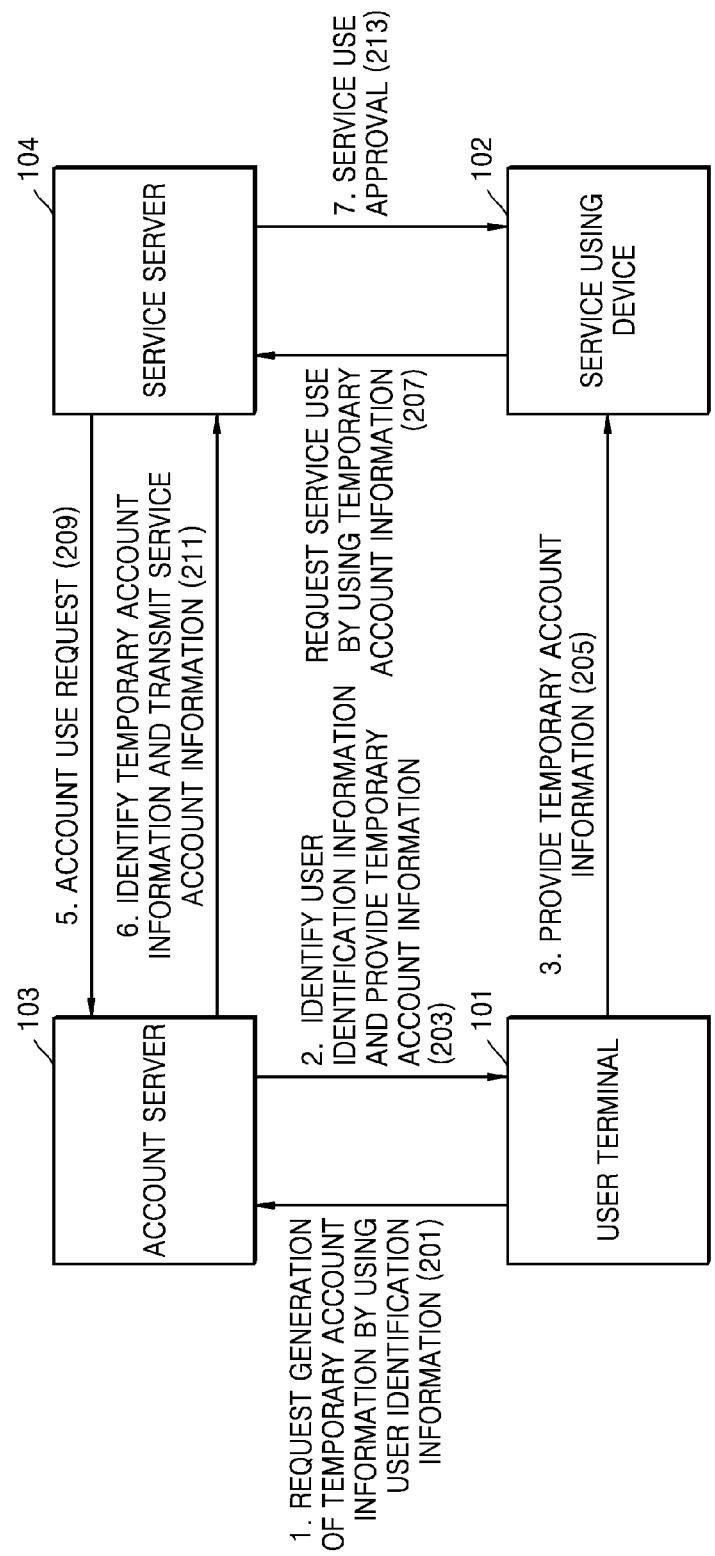
FIG. 2 illustrates a system for providing account information, according to some embodiments.

FIG. 2 illustrates a system for providing account information, according to some embodiments.

In operation 201, the user terminal 101 may request generation of temporary account information by using user identification information. The user identification information is information used to identify a user, and for example, may include an ID and a password, a serial number, an internet protocol (IP) address, a media access control (MAC) address, transaction information, and biometric information of the user terminal 101 used by the account server 103 to identify a user of the user terminal 101, but is not limited thereto.

According to some embodiments, the transaction information may include information about a finance account, a credit card, and a finance transaction certificate. The biometric information is intrinsic information of a living body for identifying an individual, and may include information about not only an iris, a fingerprint, finger veins, a cornea, a face, and a voice pattern (tone and volume), but also user intrinsic behaviour information (gestures, gait, and posture), but is not limited thereto.

According to some embodiments, the user terminal 101 may obtain the user identification information, based on user authentication information. The user authentication information is information used by the user terminal 101 to authenticate the user, and may include information about biometric information, a lock pattern, and a password, but is not limited thereto.

For example, the user terminal 101 may obtain fingerprint information of the user through a user interface. The user terminal 101 may authenticate whether the user has proper authorization to use the user terminal 101, based on the obtained fingerprint information. Also, the user terminal 101 may identify the user and obtain fingerprint information, i.e., the user identification information, based on the obtained fingerprint information.

According to some embodiments, the user authentication information may be the same as or different from the user identification information. In other words, the user terminal 101 may obtain the user authentication information to use the obtained user authentication information as the user identification information, or to obtain or generate separate user identification information based on the obtained user authentication information.

In operation 203, the account server 103 may identify the user identification information, generate temporary account information, and provide the temporary account information to the user terminal 101. The user identification information may be included in a temporary account information generation request transmitted by the user terminal 101. The account server 103 may determine whether to provide the temporary account information, based on the user identification information transmitted by the user terminal 101.

In operation 205, the user terminal 101 may provide the temporary account information to the service using device 102. As described above, the service using device 102 may be a service using device used to access an online service. Also, according to some embodiments, the service using device 102 may be a device having reliability lower than a certain standard, such as a computer installed in a public place, and may be a device other than the user terminal 101.

According to some embodiments, the user terminal 101 may provide, to the service using device 102, the temporary account information via short-range wireless communication. For example, the user terminal 101 may transmit the temporary account information to the service using device 102 via a NFC method or a Bluetooth method.

Also, according to some embodiments, the user terminal 101 may transmit the temporary account information to the service using device 102 or an external device by using a mobile communication method. For example, the user terminal 101 may transmit the temporary account information to the service using device 102 or the external device via SMS. Also, the user terminal 101 may transmit the temporary account information to the service using device 102 or the external device through a cellular network, such as 3G or LTE. According to some embodiments, the external device may be a device other than the user terminal 101 and the service using device 102.

Also, according to some embodiments, the user terminal 101 may output the temporary account information for the user to directly input the temporary account information to the service using device 102. In addition, the user terminal 101 may display a graphical user interface (GUI) to receive a user input, and transmit the temporary account information to the service using device 102, based on the received user input.

In operation 207, the service using device 102 may request a service server 104 for service use by using the temporary account information. For example, the service using device 102 may transmit the obtained temporary account information to the service server 104, and request the service server 104 for log in or service access approval for using an online service. According to some embodiments, the service server 104 may include a service provider and a server of the service provider.

In operation 209, the service server 104 may transmit an account use request by using the temporary account information received from the service using device 102. In other words, the service server 104 may request the account server 103 for user identification and authentication, based on the temporary account information received from the service using device 102 used by the user of the user terminal 101.

In operation 211, the account server 103 may identify the temporary account information and transmit service account information to the service server 104. In other words, the account server 103 may identify the service server 104 and identify the temporary account information to determine which user is to use which service. The account server 103 may transmit, to the service server 104, the service account information corresponding to the temporary account information and an identified service.

According to some embodiments, the account server 103 may request only service use permission instead of an ID and a password, or a PIN code of the user, which is one of the service account information, or may provide a UID used by the account server 103 and the service server 104 to identify the user, the UID being agreed between the account server 103 and the service server 104.

In operation 213, the service server 104 may notify the service using device 102 that the service use is approved, or transmit data related to an accessed (logged in) screen by using the service account information. For example, the service server 104 may provide information indicating that the service use is allowed, to the service using device 102, or provide a certain uniform resource locator (URL) to display a webpage indicating that the online service is accessed.

In the present specification, temporary account information is account information set such that a service is accessed only a certain number of times or for a certain period of time, and may be discarded after the certain number of times or the certain period of time. For example, temporary account information may be set to be deleted after being used three times, or to be deleted three hours after generation. Alternatively, temporary account information may be set to be deleted at a certain time (for example, at 11:00 PM).

Accordingly, even when the temporary account information input to the service using device 102 is leaked due to hacking or the like, the leaked temporary account information is unable to be used after being used the certain number of times or after the certain period of time.

Also, according to some embodiments, one piece of temporary account information may be generated for not only one service but at least one online service used by the user, and the account server 103 may identify the service server 104 and provide service account information corresponding to the identified service server 104, and thus the user may not have to remember any information about an account of an online service.

In addition, according to some embodiments, the account server 103 may generate one piece of temporary account information for some of at least one online service account used by the user, according to a user input. In other words, only some of at least one service used by the user may be set to be accessed by using the temporary account information.

For example, the account server 103 may generate temporary account information corresponding only to a Google account and a Facebook account from among the Google account, the Facebook account, and a Twitter account of a certain user. When the user is to use a Twitter service by using the temporary account information corresponding only to the Google account and the Facebook account, the account server 103 may not transmit service account information to a Twitter service server because the temporary account information generated by the account server 103 is not temporary account information corresponding to the Twitter account of the user.

In other words, the account server 103 may set only some services to be used by using the temporary account information by matching the temporary account information to accounts of the some services, from among at least one service account of the user, based on a user input.

Figure 3:
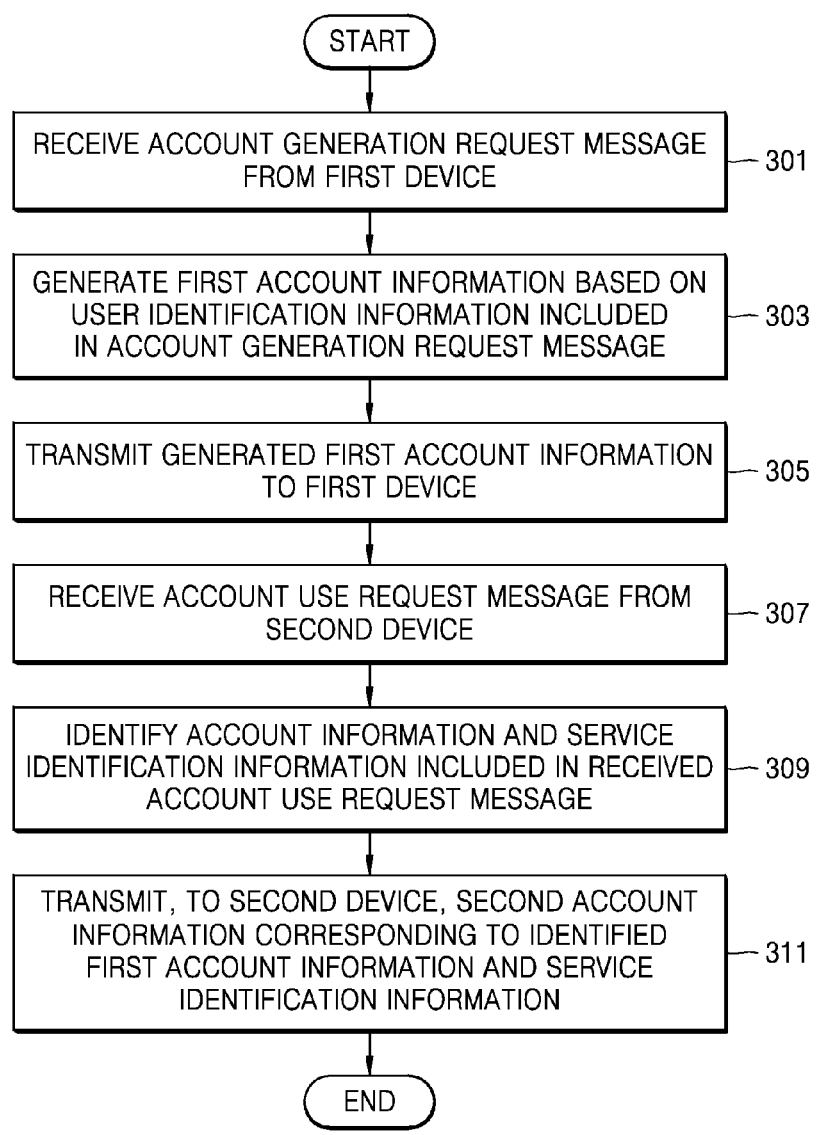
FIG. 3 is a flowchart of a method by which an account server provides temporary account information, according to some embodiments.

FIG. 3 is a flowchart of a method by which an account server provides temporary account information, according to some embodiments. According to some embodiments, a first device of FIG. 3 may include the user terminal 101 described above, and a second device may include the service server 104.

In operation 301, an account server may receive an account generation request message from the first device. According to some embodiments, the account generation request message is a message requesting generation of temporary account information, and may include user identification information. The user identification information may include information obtained by the first device based on user authentication information. According to some embodiments, the user identification information may include biometric information. Examples of the biometric information may include information about a fingerprint, an iris, voice, etc., but are not limited thereto.

In operation 303, the account server may generate first account information, based on the user identification information included in the account generation request message. The first account information may include temporary account information.

According to some embodiments, a length of the first account information may be determined based on a type of the user identification information. For example, when the user identification information is iris information, the length of the first account information may be determined to be 128 bits, and when the user identification information is device identification information, the length of the first account information may be determined to be 64 bits. In other words, the account server may determine security strength (level) according to the user identification information, and determine the length of the first account information to be generated, based on the determined security strength (level).

According to some embodiments, the account server may generate a random number having a size corresponding to the determined length of the first account information, and generate the first account information, based on the generated random number. Also, the account server may convert the generated random number to a character string to generate the first account information. According to some embodiments, the character string is a group of numbers, characters, and symbols, and is not restricted by an arrangement or size. In addition, while converting the generated random number to a character string, the account server may determine whether the character string is unable to be recognized by a user or distinguished from another character string, and generate the first account information, based on a result of the determination.

According to some embodiments, the account server may authenticate the user, based on the user identification information received from the first device. The account server may authenticate the user, and generate the first account information based on a result of the authentication.

In operation 305, the account server may transmit the generated first account information to the first device. According to some embodiments, the account server may transmit the first account information by using a public key (asymmetric key) encryption method (ElGamal, Rabin, RSA, or the like), or a secret key (symmetric key) encryption method (DES, AES, RC5, SEED, or the like).

In operation 307, the account server may receive an account use request message from the second device. According to some embodiments, the account use request message is a message requesting use of second account information, and may include the first account information and service identification information. According to some embodiments, the second account information may include service account information.

According to some embodiments, the second device may include a service server. The second device may receive the first account information from a service using device, i.e., a certain device used by the user to access an online service, and transmit the account use request message to the account server, based on the received first account information.

According to some embodiments, the account use request message may include at least one of the service identification information and the first account information. According to some embodiments, the service identification information is information for identifying a service, and may include information about a service provider, such as domain information, address information (IP address or MAC address) of a service server. However, the service identification information is not limited thereto.

According to some embodiments, the account server may transmit an account use confirmation request to the first device, based on the account use request message, and receive a response from the first device. The account server may selectively transmit the second account information to the second device, based on the response of the first device.

In operation 309, the account server may identify account information and the service identification information included in the received account use request message. In other words, the account server may identify which service server transmitted the account use request message, and identify which user is trying to use a service, based on the account information included in the account use request message.

For example, the account server may compare the generated first account information and the account information included in the account use request message to identify which user is trying to use a service, and identify which service is to be used, based on the service identification information included in the account use request message.

In operation 311, the account server may transmit, to the second device, the second account information corresponding to the identified first account information and service identification information. According to some embodiments, the second account information may be service account information. The service account information may be account information used to use an online service. Also, according to some embodiments, the second account information may include account information of a user registered to the second device.

For example, when an account use request message is received from a Facebook service server, the account server may identify a certain user, based on the first account information included in the account use request message, select Facebook service account information from among at least one piece of service account information of the identified certain user, and provide the Facebook service account information to the Facebook service server.

According to some embodiments, the account server may transmit, as the second account information, a UID used to identify a user, the UID being determined according to an agreement with the second device, or transmit a message requesting to allow the identified certain user to use a service.

According to some embodiments, the account server may store the generated first account information. The account server may delete the generated first account information after a certain period of time or based on a number of times the account use request message is received from the second device. When the first account information is deleted, the account server is neither able to select the second account information corresponding to the first account information nor able to transmit the second account information to the second device. In other words, the user is unable to use an online service based on the deleted first account information. In other words, the first account information may be set to be valid only until a certain period of time has passed or for only a certain number of login times.

Also, according to some embodiments, the account server may obtain the second account information and store the obtained second account information. The second account information may be obtained according to a user input, from a service server, such as the second device, or from the first device.

According to some embodiments, the account server may receive an account information register request message from the first device. At least one piece of second account information corresponding to at least one service may be obtained based on at least one piece of account information included in the account information register request message.

Also, according to some embodiments, the account server may store at least one piece of second account information as one group. For example, the account server may classify and store at least one piece of second account information according to users, or according to services.

Figure 4:
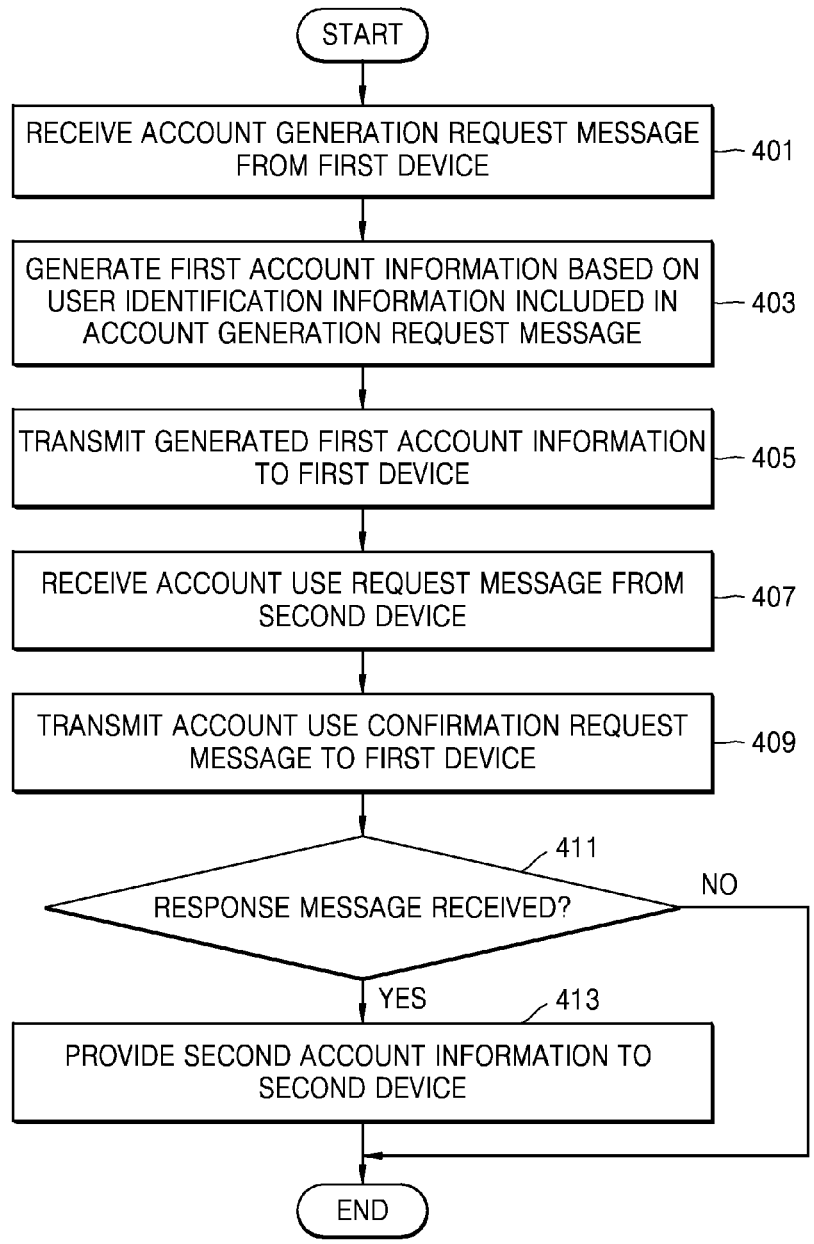
FIG. 4 is a detailed flowchart of a method by which an account server provides temporary account information, according to some embodiments.

FIG. 4 is a detailed flowchart of a method by which an account server provides temporary account information, according to some embodiments.

According to some embodiments, a first device of FIG. 4 may include the user terminal 101 described above, and a second device may include the service server 104. Also, a third device may include the service using device 102. According to some embodiments, first account information and second account information correspond to those of FIG. 3.

In operation 401, the account server may receive an account generation request message from the first device. In other words, the account server may receive a first account information generation request including user identification information from the first device.

In operation 403, the account server may generate the first account information, based on the user identification information included in the account generation request message.

In other words, the account server may generate the first account information corresponding to at least one service, based on the user identification information.

In operation 405, the account server may transmit the generated first account information to the first device. In other words, the account server may transmit the generated first account information in operation 403 to the first device.

In operation 407, the account server may receive an account use request message from the second device. In other words, the account server may receive the account use request message transmitted by the second device that received the first account information from the third device used by a user of the first device. Since details about operations 401 through 407 correspond to those described above, descriptions thereof will not be provided again.

In operation 409, the account server may transmit an account use confirmation request message to the first device. In other words, the account server may determine whether the user of the first device is trying to use a service provided by the second device, by using the third device.

According to some embodiments, the account use confirmation request message may include the first account information and service identification information. The first device (A user terminal 101) may receive the account use confirmation request message, and generate a response message with respect to the received account use confirmation request message.

According to some embodiments, the first device (the user terminal 101) may obtain user authentication information, and determine whether to generate the response message, based on the obtained user authentication information.

In operation 411, the account server may determine whether the response message is received. When the response message is not received, the account server does not provide the second account information to the second device.

In operation 413, when the response message is received, the account server may provide the second account information to the second device. According to some embodiments, the account server may selectively provide the second account information to the second device, based on information about service use of the user included in the response message.

According to some embodiments, the response message may include user identification information. The account server may identify the user based on the user identification information included in the received response message, determine whether the identified user is a user having proper authorization for using a service, and selectively provide the second account information to the second device based on a result of the determination.

FIG. 5 is a diagram for describing a method of storing service account information and temporary account information, according to some embodiments.

Referring to FIG. 5, an account server stores at least one service account information set 501. The service account information set 501 may include account information with respect to each of a plurality of online services.

In FIG. 5, each piece of service account information is illustrated in a service provider, an ID, and a password, but the service account information may be a PIN code, biometric information, transaction information, and UID, but is not limited thereto.

According to some embodiments, the account server may obtain and store each piece of service account information. According to some embodiments, the account server may obtain each piece of service account information from a user terminal, or according to a user input. Also, the account server may obtain a UID used to identify each service server and service account information, based on each piece of the obtained service account information. The UID may be determined according to an agreement between the service server and the account server.

According to some embodiments, the account server may store each piece of the obtained service account information in one service account information set 501. In other words, the account server may store, as one group, a plurality of pieces of service account information of one user.

According to some embodiments, the account server may generate one piece of temporary account information 503 corresponding to one service account information set 501. In other words, the account server may generate one piece of temporary account information 503 corresponding to a plurality of pieces of user account information. The account server may receive an account use request message including temporary account information and service identification information from a service server, and transmit, to the service server, service account information corresponding to the service identification information and the temporary account information.

Also, according to some embodiments, the account server may generate at least one piece of temporary account information corresponding to only a part of the service account information set 501. In other words, the account server may generate first temporary account information corresponding only to a Google account, a Facebook account, and a Twitter account, and second temporary account information corresponding only to an Amazon account and an Ebay account. In other words, the account server may be set to access only some of service accounts by using temporary account information, based on a user input.

According to some embodiments, a user may use a plurality of online services by using one piece of temporary account information, and does not have to remember pieces of service account information respectively corresponding to the plurality of online services so as to use the plurality of online services.

Figure 6:
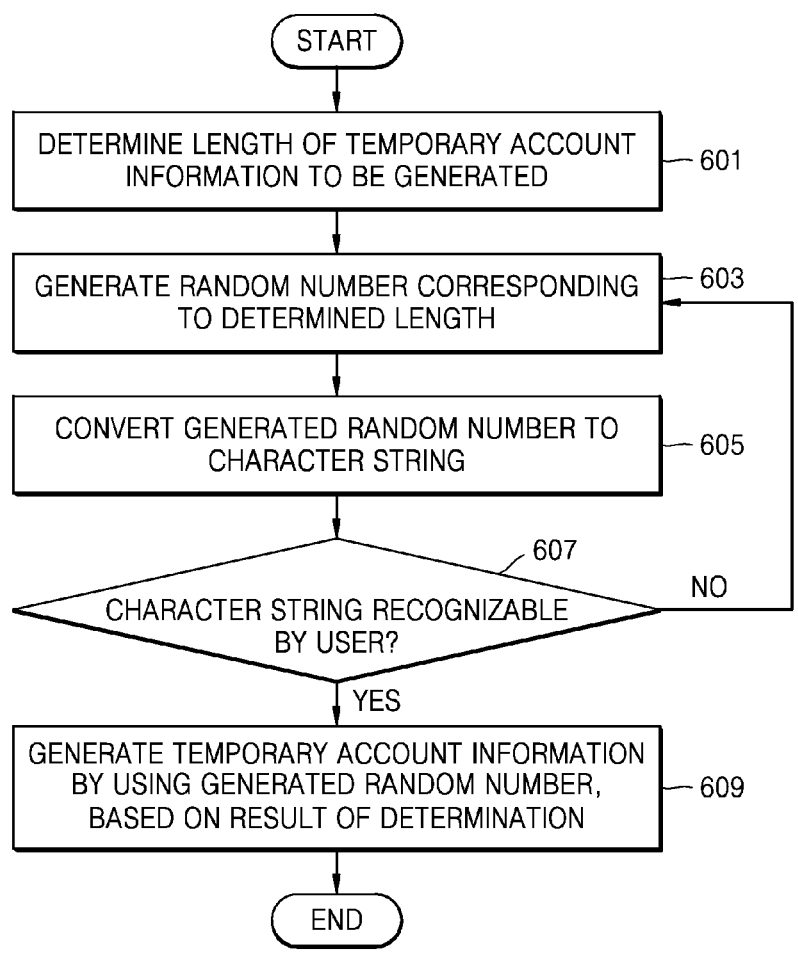
FIG. 6 illustrates a temporary account information generating algorithm according to some embodiments.

FIG. 6 illustrates a temporary account information generating algorithm according to some embodiments. According to some embodiments, a first device of FIG. 6 may include the user terminal 101 described above. Also, an account server may receive a temporary account information generation request from the first device, and generate temporary account information.

In operation 601, the account server may determine a length of temporary account information to be generated. According to some embodiments, the account server may determine the length of the temporary account information, based on user identification information.

According to some embodiments, the account server may determine the length of the temporary account information, based on a type of the user identification information. For example, the account server may generate an ID and a password in the length of 128 bits when the user identification information is an iris, and in the length of 64 bits when the user identification information is a device intrinsic number. Also, the account server may generate an ID and a password having different lengths.

Also, according to some embodiments, the account server may determine the length of the temporary account information, based on the number of pieces of user identification information. For example, when the received user identification information includes fingerprint information of a thumb and fingerprint information of an index finger, the account server may generate an ID and a password in the length of 128 bits, and when the received user identification information includes fingerprint information of only a thumb, the account server may generate an ID and a password in the length of 64 bits.

In operation 603, the account server may generate a random number corresponding to the determined length. For example, when the account server determined the length of the temporary account information to 64 bits in operation 601, the account server may generate a random number corresponding to the length of 64 bits. According to some embodiments, the random number may include not only a pseudo random number, but also a true random number. Also, according to some embodiments, the account server may generate the random number, based on a certain encoded seed value. The certain encoded seed value may include an encoded pseudo random number.

In operation 605, the account server may convert the generated random number to a character string. According to some embodiments, the account server may convert the generated random number to a character string by using the American Standard Cord for Information Interchange (ASCII) code. The ASCII code is a code for converting a number to a sign, and since it is obvious to one of ordinary skill in the art, details thereof will not be provided herein.

In operation 607, the account server may determine whether the character string is recognizable by a user. According to some embodiments, the character string recognizable by the user may denote a character string identifiable or readable by the user, and a character string in which each character or number included in the character string is distinguishable from another character or number included in the character string, but is not limited thereto.

For example, when the character string is obtained based on ASCII code and based on a random number from 0 to 31, the character string may be a control character that is unable to be identified or read by the user. Accordingly, the account serer may determine that the character string includes a character that is not recognizable by the user.

Also, when a number 0 and an alphabet o exist together in the character string, they are difficult to be distinguished by the user, and thus the account server may determine that the character string includes a character that is not recognizable by the user. In other words, the account server may determine whether the character string includes characters recognizable by the user, based on a certain standard.

In operation 609, the account server may generate temporary account information by using the generated random number, based on a result of the determination. According to some embodiments, when the random number generated in operation 603 is converted to the character string, and the character string is recognizable by the user, the account server may generate the temporary account information by using the random number generated in operation 603. Also, when it is determined that the character string is not recognizable by the user in operation 607, the account server may generate a new random number or change a part of the character string to generate the temporary account information. However, an embodiment is not limited thereto.

Figure 7:
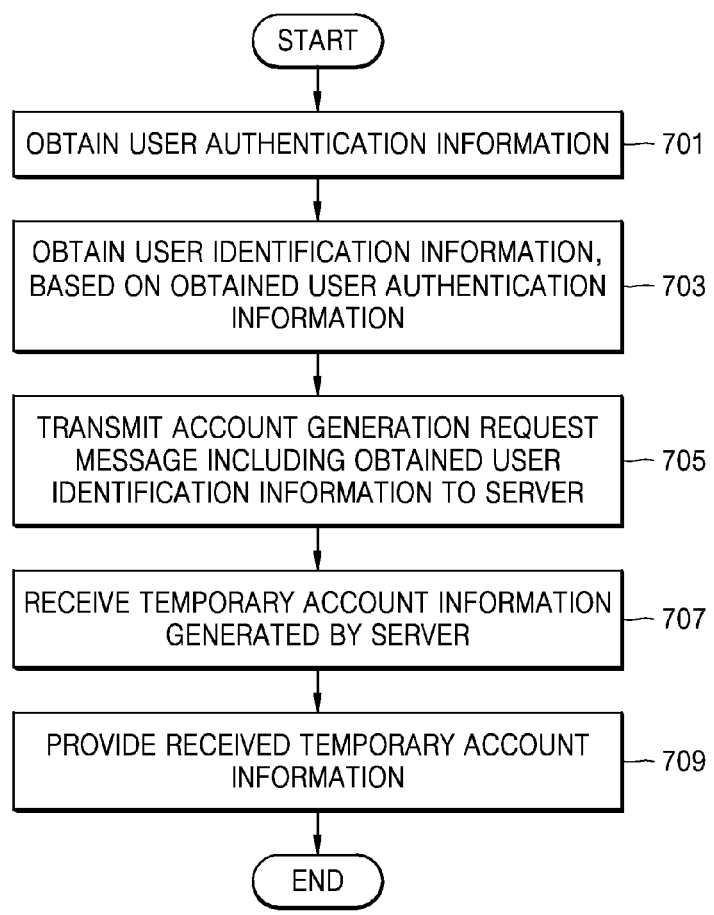
FIG. 7 is a flowchart of a method by which a user terminal provides temporary account information, according to some embodiments.

FIG. 7 is a flowchart of a method by which a user terminal provides temporary account information, according to some embodiments.

In operation 701, the user terminal may obtain user authentication information. According to some embodiments, the user terminal may obtain the user authentication information through a user interface (UI).

In operation 703, the user terminal may obtain user identification information, based on the obtained user authentication information. According to some embodiments, the user terminal may authenticate a user, based on the obtained user authentication information. For example, the user terminal may obtain iris information from the user and compare the obtained iris information and stored iris information to authenticate the user.

According to some embodiments, the user terminal may obtain the user identification information, based on an authentication result. The user terminal may use the user authentication information obtained in operation 701 as the user identification information, or separately obtain the user identification information based on the authentication result. For example, the user terminal may use, as the user identification information, fingerprint information obtained as the user authentication information of the authenticated user, or voice information of the authenticated user, a PIN code of the user, a transaction number of the user, or account information of the user pre-registered in an account server, but an embodiment is not limited thereto.

In operation 705, the user terminal may transmit an account generation request message including the obtained user identification information to a server. According to some embodiments, the account generation request message may include the user authentication information. Also, the account generation request message may be encoded and transmitted. According to some embodiments, the user terminal may encode the account generation request message by using a device serial number of the user terminal as a secret key, and transmit the account generation request message, but an embodiment is not limited thereto.

According to some embodiments, the account server may perform user authentication based on the user authentication information included in the account generation request message.

In operation 707, the user terminal may receive temporary account information generated by the account server. According to some embodiments, a length of the temporary account information may be determined based on a type of the user identification information.

In operation 709, the user terminal may provide the received temporary account information. According to some embodiments, the user terminal may transmit he received temporary account information to a service using device. The service using device may be a device used to access or use an online service. The service using device may be a device having reliability lower than a certain standard, and may include an external device other than the user terminal.

According to some embodiments, the user terminal may transmit the received temporary account information to the service using device, via short-range wireless communication. For example, the user terminal may approach the service using device to transmit the temporary account information via NFC, or access a same access point (AP) as the service using device to provide the temporary account information via Wi-Fi direct. However, an embodiment is not limited thereto.

According to some embodiments, the user terminal may transmit the temporary account information to the external device via a mobile communication method. In other words, the user terminal may transmit the temporary account information to the external device by using SMS, or by using a 3G or LTE communication method. For example, the user terminal may obtain information (or account information) of the external device via a certain social network service (SNS), and transmit the temporary account information to the external device by using a remote distance mobile communication method, based on the obtained information.

Also, according to some embodiments, the user terminal may provide first account information to a service server. In other words, the user terminal may directly transmit the first account information to the service server, together with a service use request message.

Figure 8:
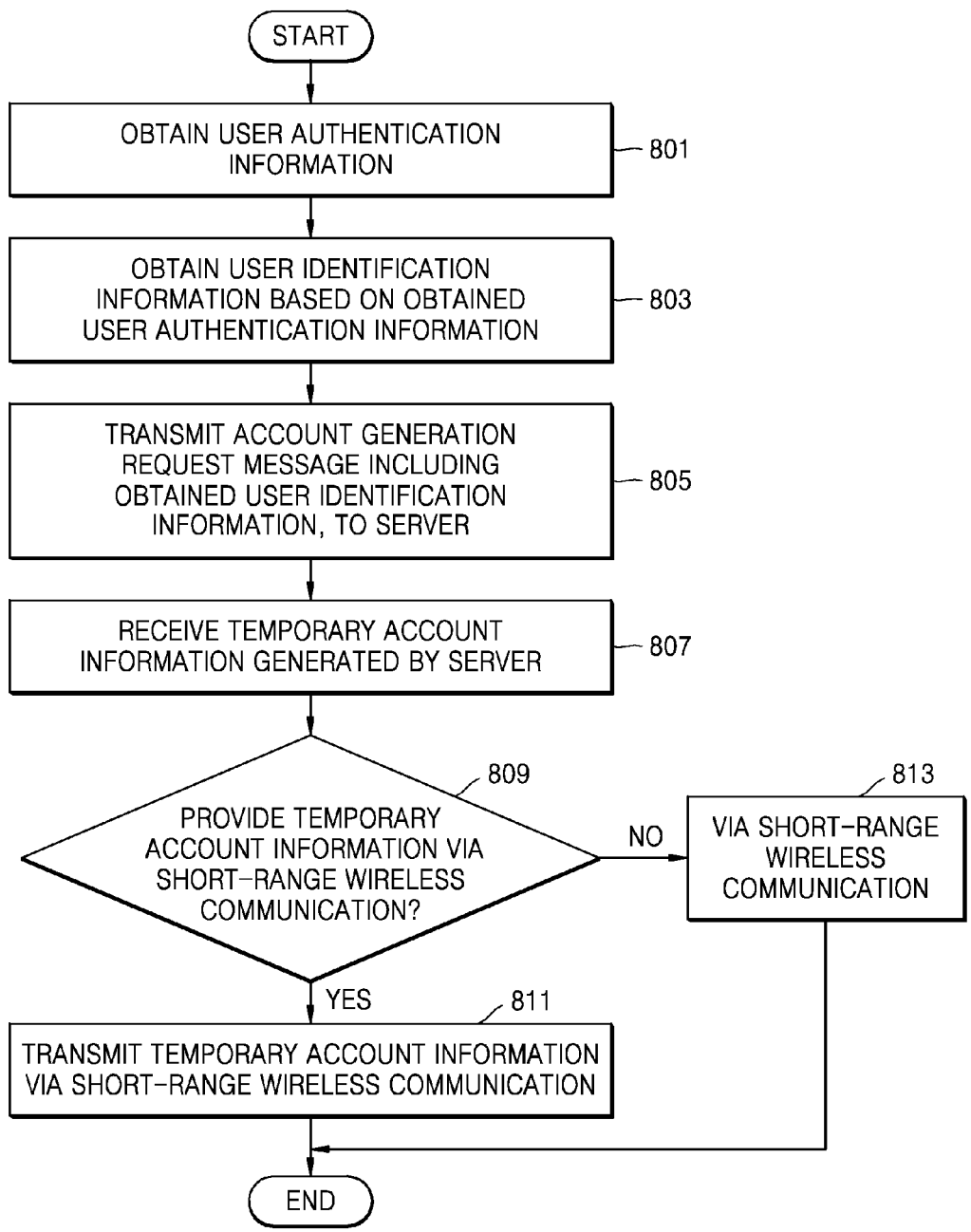
FIG. 8 is a detailed flowchart of a method by which a user terminal provides temporary account information, according to some embodiments.

FIG. 8 is a detailed flowchart of a method by which a user terminal provides temporary account information, according to some embodiments.

In operation 801, the user terminal may obtain user authentication information. According to some embodiments, the user terminal may obtain the user authentication information through UI.

In operation 803. The user terminal may obtain user identification information, based on the obtained user authentication information.

In operation 805, the user terminal may transmit an account generation request message including the obtained user identification information, to a server.

In operation 807, the user terminal may receive temporary account information generated by an account server. Since details about operations 801 through 807 correspond to those described above, descriptions thereof will not be provided again.

In operation 809, the user terminal may determine whether to provide account information. According to some embodiments, the user terminal may provide the temporary account information to a service using device, or to a user. For example, the user terminal may transmit the temporary account information to the service using device, or output the temporary account information through a display of the user terminal. Also, according to some embodiments, the user terminal may determine whether to provide account information via short-range communication or mobile communication.

However, an embodiment is not limited thereto, and the user terminal may provide the temporary account information to a service server, by using a mobile wireless communication or wired communication method.

According to some embodiments, the user terminal may output a GUI, and receive a user input based on the output GUI. The user terminal may embody and output, in the GUI, various methods of processing temporary account information, and determine one method based on a received user input.

In operation 811, the user terminal may transmit the temporary account information based on determination of operation 809. According to some embodiments, the user terminal may transmit the temporary account information by selecting one of a plurality of wireless communication methods.

In operation 813, the user terminal may output the temporary account information. According to some embodiments, the user terminal may not transmit the temporary account information to another device, such as the service using device, the service server, or the like, but may output the temporary account information through the display of the user terminal FIG. 9 is a diagram for describing a method by which a user terminal obtains user authentication information, according to some embodiments.

Figure 9:
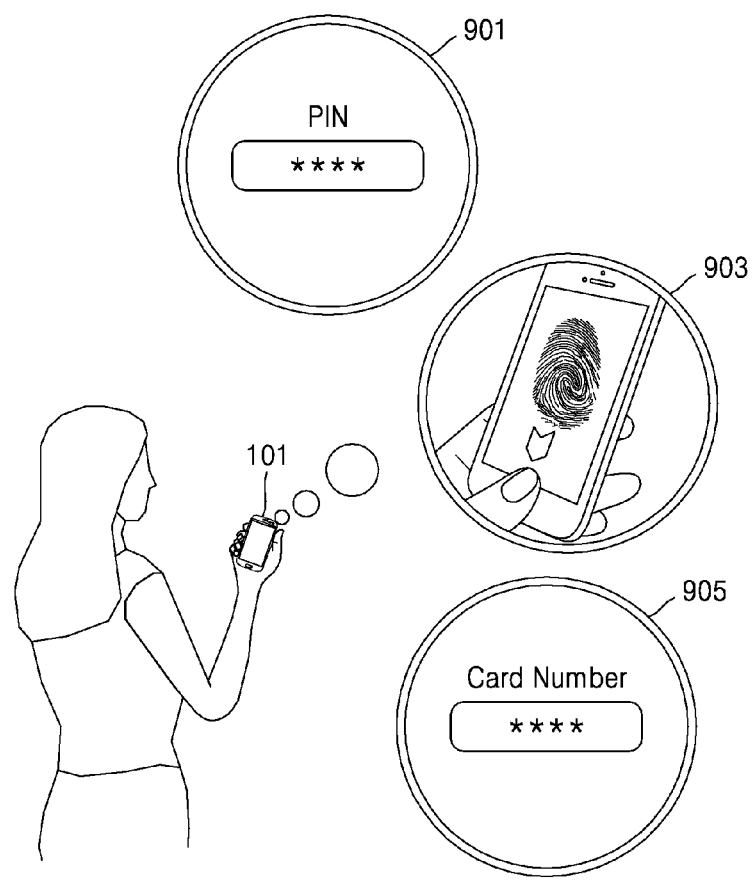
FIG. 9 is a diagram for describing a method by which a user terminal obtains user authentication information, according to some embodiments.

Referring to FIG. 9, the user terminal 101 may obtain user authentication information based on a user input. According to some embodiments, the user terminal 101 may obtain a PIN code 901 from a user, and obtain fingerprint information 903. Also, the user terminal 101 may obtain a card number 905 from the user, but an embodiment is not limited thereto.

According to some embodiments, the user terminal 101 may obtain the user authentication information through various UIs, sensors, and audio/video (A/V) input/output devices. For example, the user terminal 101 may obtain a number or an alphabet through a virtual keyboard, obtain fingerprint information through a fingerprint sensor, or iris information by using a camera.

Also, according to some embodiments, the user terminal 101 may output GUI for receiving the user authentication information from the user.

Figure 10:
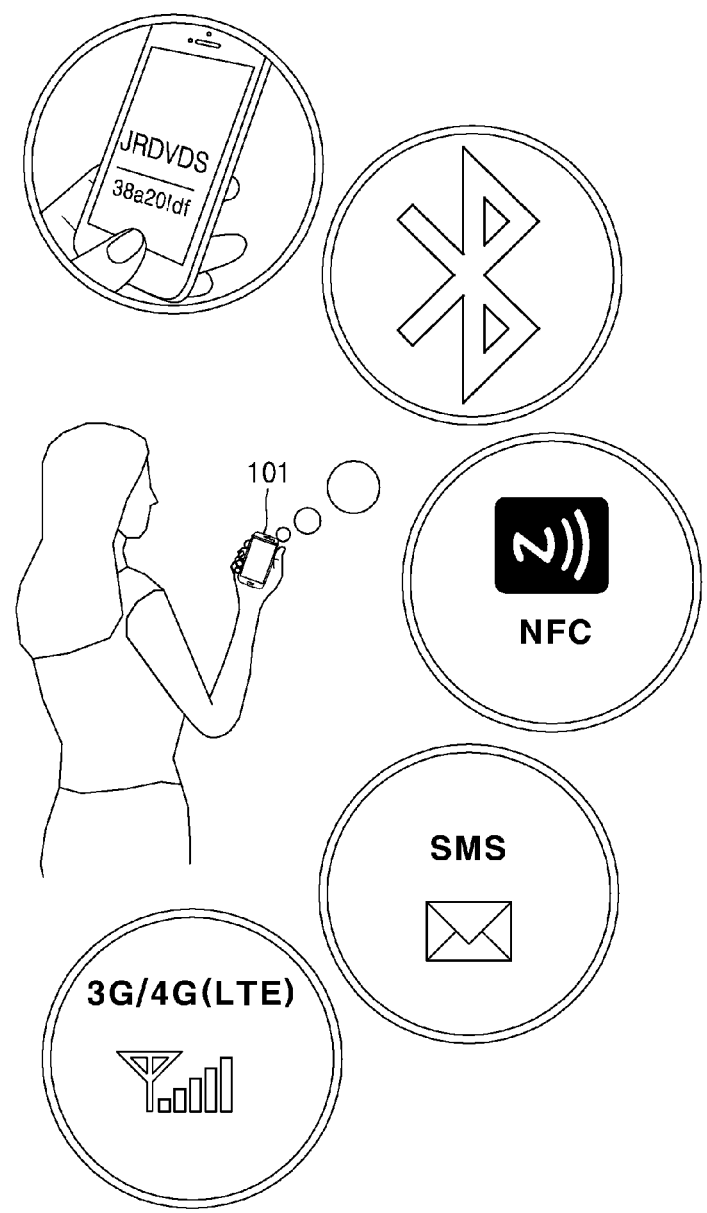
FIGS. 10 and 11 are diagrams for describing a method by which a user terminal provides temporary account information, according to some embodiments.
Figure 11:
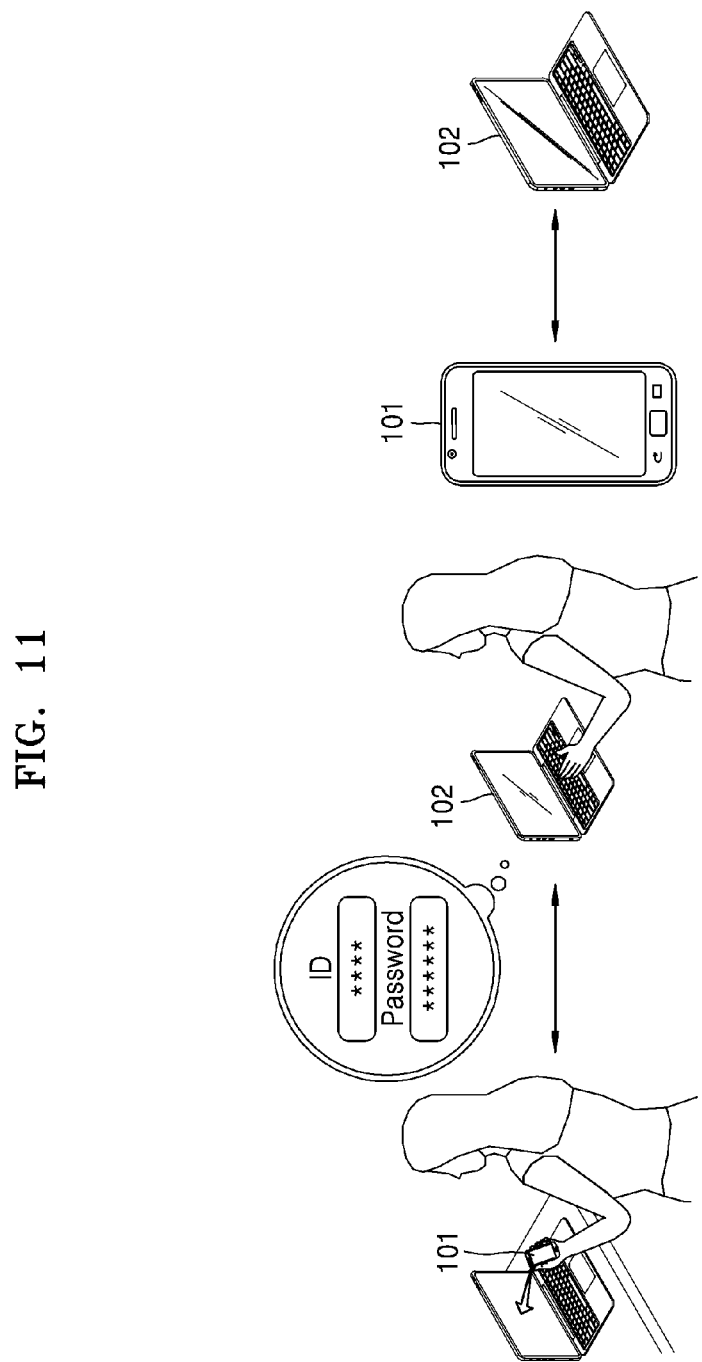

FIGS. 10 and 11 are diagrams for describing a method by which a user terminal provides temporary account information, according to some embodiments.

Referring to FIG. 10, the user terminal 101 may provide temporary account information through various methods. As described above, the user terminal 101 may receive temporary account information from an account server, and select a method of providing the received temporary account information.

According to some embodiments, the user terminal 101 may output the received temporary account information. In other words, the temporary account information may be provided to the user. Also, according to some embodiments, the user terminal 101 may transmit the temporary account information to a service using device via a short-range wireless communication method. Since there are a plurality of wireless communication methods, the user terminal 101 may select one of a plurality of short-range wireless communication methods, based on a user input. The user terminal 101 may activate a short-range wireless communication module corresponding to the selected method, and transmit the temporary account information through a message in a certain format.

For example, the user terminal 101 may transmit the temporary account information to the service using device by using an NFC module or a Bluetooth module, or output the temporary account information through the display of the user terminal 101. Also, when transmitting the temporary account information via short-range wireless communication, the user terminal 101 may encode and transmit the temporary account information.

According to some embodiments, the user terminal 101 may encode the temporary account information by using a device serial number of the user terminal 101 as an encryption key, and transmit the temporary account information. Also, according to some embodiments, when transmitting the temporary account information via remote mobile communication (for example, SMS, 3G, or 4G), the user terminal 101 may also encode the temporary account information by using the device serial number as an encryption key, and transmit the temporary account information. However, an embodiment is not limited thereto.

Referring to FIG. 11, when the user terminal 101 outputs the temporary account information through the display, the user may directly input the temporary account information to the service using device 102.

Also, according to some embodiments, the user terminal 101 may transmit the temporary account information to the service using device 102 by using short-range wireless communication. The service using device 102 may transmit a service use request message to a service server, based on the received temporary account information.

Also, according to some embodiments, the service using device 102 may display the received temporary account information on the display, or input the received temporary account information to a web browser or an application. However, an embodiment is not limited thereto, and the service using device 102 may receive a user input and process the received temporary account information based on the user input.

Figure 12:
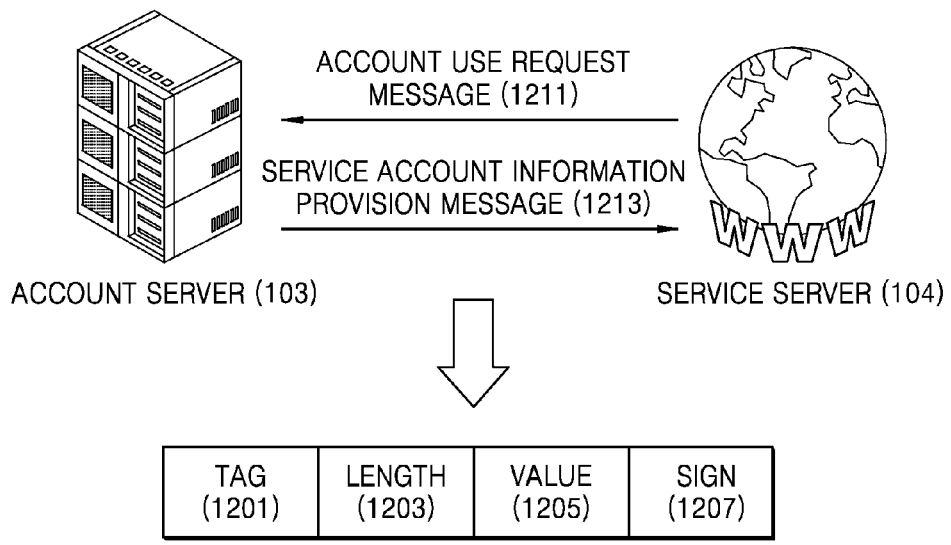
FIG. 12 illustrates a format of a message transmitted and received between a service server and an account server, according to some embodiments.

FIG. 12 illustrates a format of a message transmitted and received between a service server and an account server, according to some embodiments.

Referring to FIG. 12, an account use request message 1211 received by the account server 103 from the service server 104, and a service account information provision message 1213 transmitted from the account server 103 to the service server 104 may include a TAG field 1201, a LENGTH field 1203, a VALUE field 1205, and a SIGN field 1207.

According to some embodiments, the TAG field 1201 may include a type of a transmitted or received message. For example, the TAG field 1201 may include information for identifying whether a message received by the account server 103 or the service server 104 is the account use request message 1211 or the service account information provision message 1213.

According to some embodiments, the LENGTH field 1203 may include information about an entire length of a message. Also, according to some embodiments, the LENGTH field 1203 may include information about a length of the VALUE field 1205.

According to some embodiments, the VALUE field 1205 may include information transmitted or received by the account server 103 or the service server 104. For example, the VALUE field 1205 of the account use request message 1211 may include temporary account information and service identification information. Also, the VALUE field 1205 may include UID or user authentication information, but is not limited thereto.

According to some embodiments, the SIGN field 1207 is a field existing for authentication and security of a message, and may include an electronic signature.

The format of the message shown in FIG. 12 may vary according to embodiments. In other words, fields shown in FIG. 12 are not all essential elements, and it would be obvious to one of ordinary skill in the art that some of the fields of FIG. 12 may be excluded, or a new field may be added to the format of FIG. 12.

Figure 13:
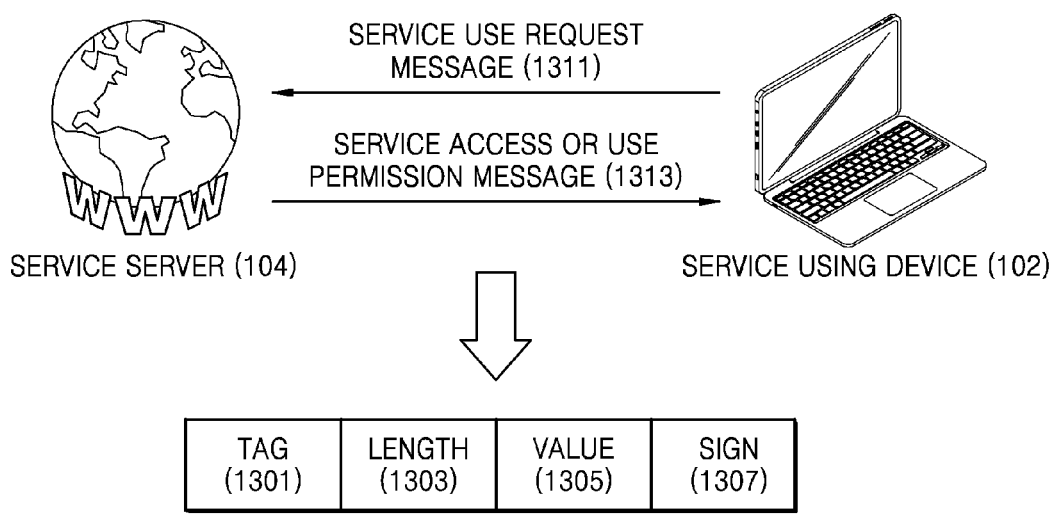
FIG. 13 illustrates a format of a message transmitted and received between a service server and a service using device, according to some embodiments.

FIG. 13 illustrates a format of a message transmitted and received between a service server and a service using device, according to some embodiments.

Referring to FIG. 13, a service use request message 1311 received by the service server 104 from the service using device 102, and a service access or use permission message 1313 transmitted from the service server 104 to the service using device 102 may include a TAG field 1301, a LENGTH field 1303, a VALUE field 1305, and a SIGN field 1307.

According to some embodiments, the TAG field 1301 may include a type of a transmitted or received message. For example, the TAG field 1301 may include information for identifying whether a message received by the service using device 102 or the service server 104 is the service use request message 1311 or the service access or use permission message 1313.

According to some embodiments, the LENGTH field 1303 may include information about an entire length of a message. Also, according to some embodiments, the LENGTH field 1303 may include information about a length of the VALUE field 1305.

According to some embodiments, the VALUE field 1305 may include information transmitted or received by the service server 104 or the service using device 102. For example, the VALUE field 1305 of the service use request message 1311 may include temporary account information. However, an embodiment is not limited thereto, and the VALUE field 1305 may include another additional information.

According to some embodiments, the SIGN field 1307 is a field existing for authentication and security of a message, and may include an electronic signature.

The format of the message shown in FIG. 13 may vary according to embodiments. In other words, fields shown in FIG. 13 are not all essential elements, and it would be obvious to one of ordinary skill in the art that some of the fields of FIG. 13 may be excluded, or a new field may be added to the format of FIG. 13.

Figure 14:
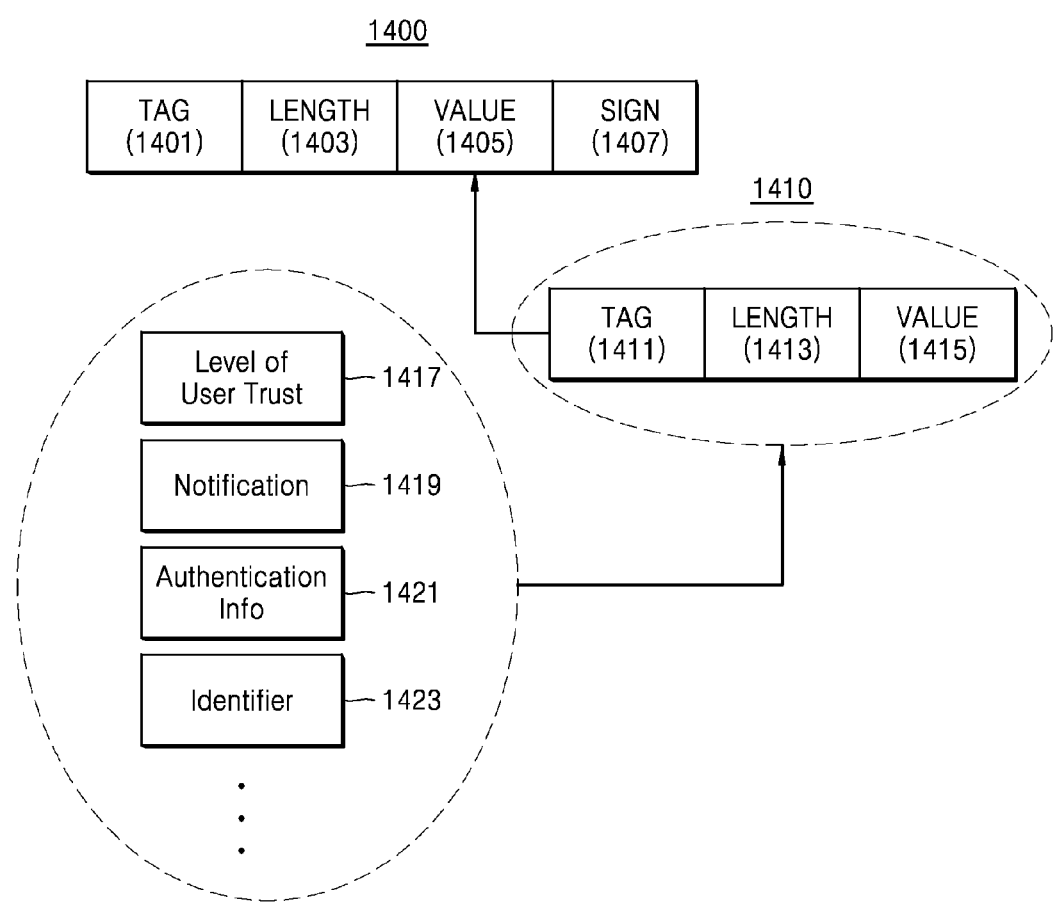
FIG. 14 is a diagram for describing a hierarchical structure of a message, according to some embodiments.

FIG. 14 is a diagram for describing a hierarchical structure of a message, according to some embodiments.

Referring to FIG. 14, a format of a first message 1400 transmitted or received by the user terminal 101 (the first device), the service using device 102 (the second device), the account server 103, or the service server 104 is illustrated. The format of the first message 1044 may include a TAG field 1401, a LENGTH field 1403, a VALUE field 1404, and a SIGN field 1407. According to some embodiments, the first message 1400 may include the message of FIG. 12 or 13.

According to some embodiments, a message transmitted or received by the user terminal 101 (the first device), the service using device 102 (the second device), the account server 103, or the service server 104 may have a hierarchical structure. For example, the VALUE field 1045 may include a second message 1410 including an additional TAG field 1411, a LENGTH field 1413, and a VALUE field 1415.

According to some embodiments, the second message 1410 may include various types of information. For example, the second message 1410 may include at least one of a level of user trust 1417, a notification 1419, authentication information 1421, and an identifier 1423. Also, the second message 1410 may include device reliability information and information about a device geological location, but is not limited thereto. Here, information included in the second message 1410 may also be included in the VALUE field 1405 of the first message 1400.

Figure 15:
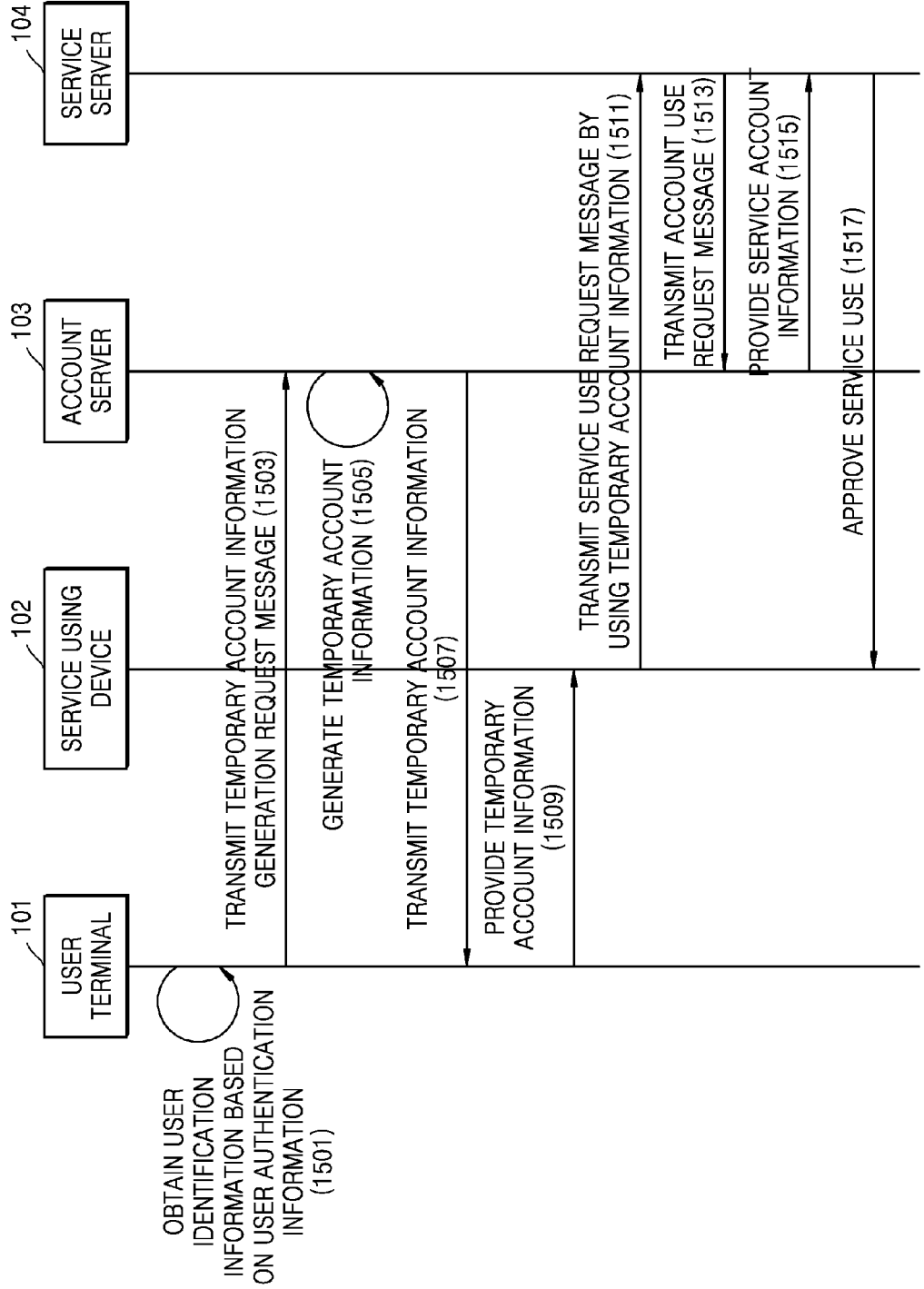
FIG. 15 is a flow chart of a temporary account information providing method according to some embodiments.

FIG. 15 is a flow chart of a temporary account information providing method according to some embodiments.

In operation 1501, the user terminal 101 may obtain user identification information based on user authentication information. According to some embodiments, the user terminal 101 may obtain the user authentication information, and obtain the user identification information based on the obtained user authentication information. Also, details of operation 1501 correspond to those described above.

In operation 1503, the user terminal 101 may transmit a temporary account information generation request message. According to some embodiments, the user terminal 101 may transmit a temporary account information service register request message to the account server 103. In other words, the user terminal 101 may apply for permission to use a temporary account information service, for using an online service through temporary account information. In addition, details of operation 1503 correspond to those described above.

In operation 1505, the account server 103 may generate the temporary account information. According to some embodiments, the account server 103 may determine a length of the temporary account information to be generated, based on the user identification information that is included in the temporary account information generation request message or separately received. Also, the account server 103 may identify a certain user, based on the received user identification information, and determine whether the identified certain user is a user having proper authorization for using the temporary account information service. In addition, details of operation 1505 correspond to those described above.

In operation 1507, the account server 103 may transmit the temporary account information. According to some embodiments, the account server 103 may generate the temporary account information by using a certain algorithm The certain algorithm used to generate the temporary account information may be determined via a user input. Details of operation 1507 correspond to those described above.

In operation 1509, the user terminal 101 may provide the temporary account information to the service using device 102. According to some embodiments, the user terminal 101 may transmit the temporary account information to the service using device 102 via wired communication or wireless communication. Also, the user terminal 101 may transmit the temporary account information to the service using device 102 via short-range wireless communication.

According to some embodiments, the user terminal 101 may output the temporary account information through the display and may output GUI through the display to receive a user input and process the temporary account information based on the user input. Details of operation 1509 correspond to those described above.

In operation 1511, the service using device 102 may transmit a service use request message by using the temporary account information. According to some embodiments, the service using device 102 may identify a service server providing a certain online service, based on a user input, and transmit the service use request message to the identified service server, based on the temporary account information received in operation 1509. Details of operation 1511 correspond to those described above.

In operation 1513, the service server 104 may transmit an account use request message to the account server 103. According to some embodiments, the account use request message may include a message requesting identification of the temporary account information. The account server 103 may identify which account server generated the temporary account information, based on the obtained temporary account information, and transmit the account use request message to the account server, based on the identification result. Details of operation 1513 correspond to those described above.

In operation 1515, the account server 103 may provide service account information. According to some embodiments, the account server 103 may provide, to the service server 104, the service account information corresponding to the temporary account information and the service identification information included in the received account use request message. Details of operation 1515 correspond to those described above.

In operation 1517, the service server 104 may approve service use. According to some embodiments, the service server 104 may approve service access or service use through the service using device 102.

Also, according to some embodiments, the service server 104 may identify a user based on the received service account information, and provide an online service corresponding to the identified user. For example, the service server 104 may allow access (log in) to an online service through the service using device 102, and transmit a webpage or certain piece of data corresponding to a service account, to the service using device 102.

Figure 16:
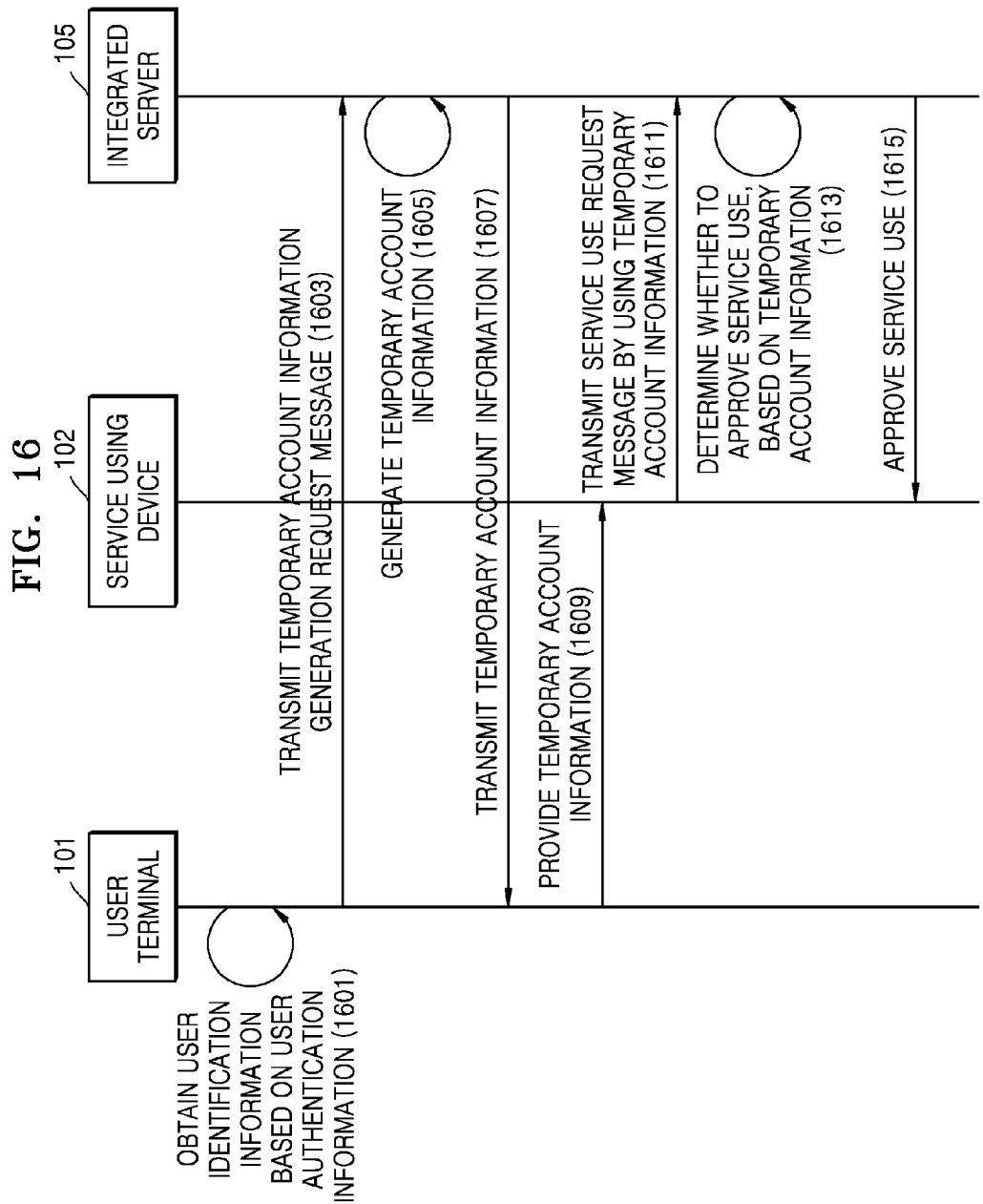
FIG. 16 is a flow chart of a temporary account information providing method provided by an integrated server, according to some embodiments.

FIG. 16 is a flow chart of a temporary account information providing method provided by an integrated server, according to some embodiments.

Referring to FIG. 16, unlike FIG. 15, an integrated server 105 in which an account server and a service server are integrated may perform functions of both the account server and the service server. According to some embodiments, the integrated server 105 may be a cloud server including an account server and a service server, which are recognized as one server by the user terminal 101 or the service using device 102.

In operation 1601, the user terminal 101 may obtain user identification information based on user authentication information. Since details thereof correspond to those described above, descriptions thereof will not be provided again.

In operation 1603, the user terminal 101 may transmit a temporary account information generation request message to the integrated server 105. The integrated server 105 may also include a server providing an online service and a temporary account information management service.

In operation 1605, the integrated server 105 may generate temporary account information. According to some embodiments, the integrated server 105 may determine a length of the temporary account information to be generated, based on the user identification information that is included in the temporary account information generation request message or separately received. According to some embodiments, the integrated server 105 may perform all operations performed by an account server, which are described above.

In operation 1607, the integrated server 105 may transmit the temporary account information to the user terminal 101. According to some embodiments, the integrated server 105 may generate the temporary account information by using a certain algorithm According to some embodiments, the integrated server 105 may perform all operations performed by an account server, which are described above.

In operation 1609, the user terminal 101 may provide the temporary account information to the service using device 102. Since details of operations 1609 correspond to those described above, descriptions thereof will not be provided again.

In operation 1611, the service using device 102 may transmit a service use request message by using the temporary account information. According to some embodiments, the service using device 102 may transmit the service use request message to the integrated server 105.

In operation 1613, the integrated server 105 may determine whether to approve service use, based on the temporary account information. According to some embodiments, the integrated server 105 may compare temporary account information stored therein and the temporary account information included in the service use request message received in operation 1611, and selectively determine whether to approve service access, based on a comparison result.

In operation 1615, the integrated server 105 may approve the service use. Also, according to some embodiments, the integrated server 105 may identify a user based on received service account information, and provide an online service corresponding to the identified user. For example, the integrated server 105 may allow access (log in) to an online service through the service using device 102, and transmit a webpage or certain piece of data corresponding to a service account, to the service using device 102.

Figure 17:
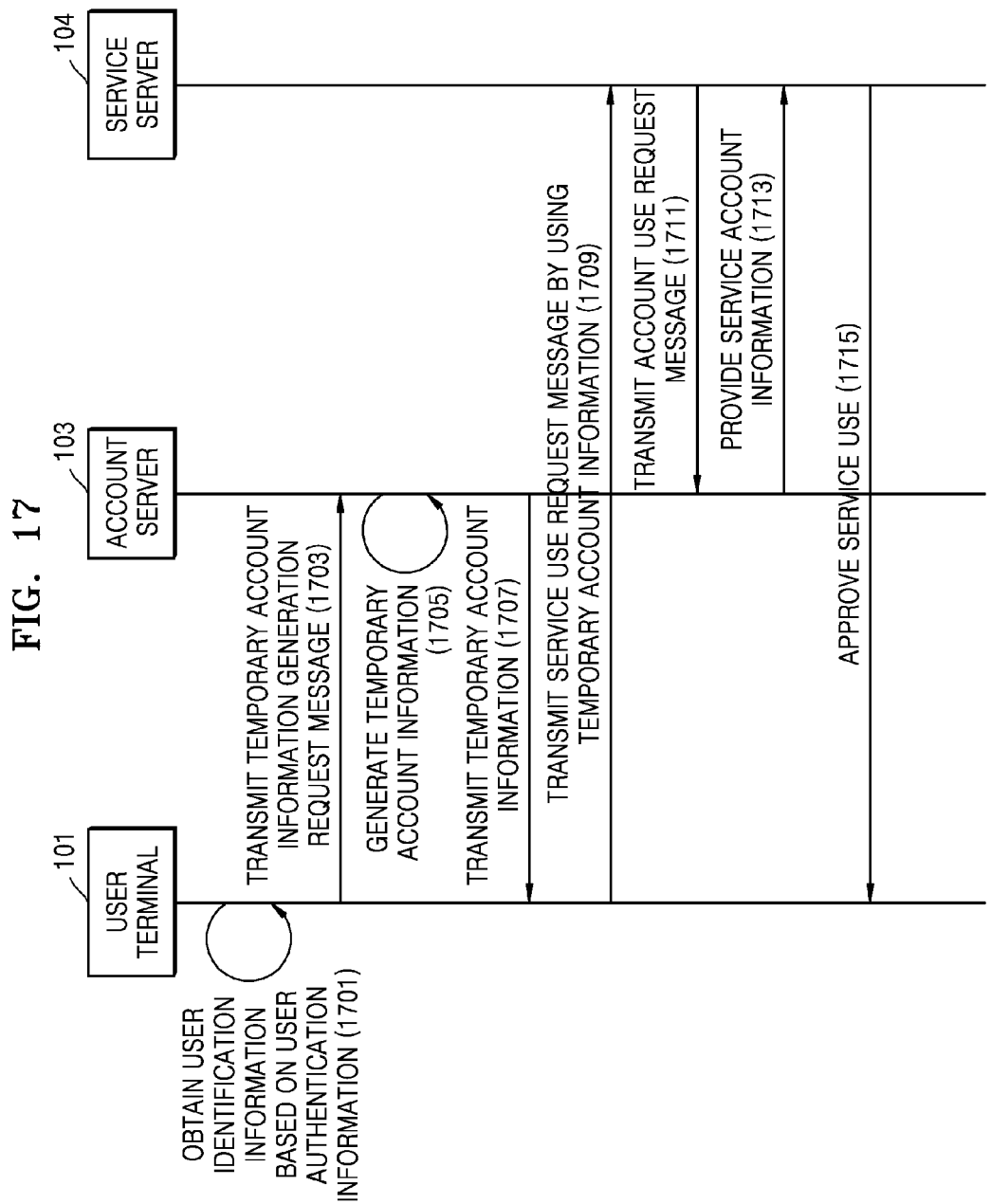
FIG. 17 is a flow chart of a temporary account information providing method when an online service is directly used through a user terminal, according to some embodiments.

FIG. 17 is a flow chart of a temporary account information providing method when an online service is directly used through a user terminal, according to some embodiments.

Referring to FIG. 17, unlike FIGS. 16 and 16, the user terminal 101 does not provide temporary account information to a service using device, but directly performs communication with the service server 104 by using temporary account information received from the account server 103. In other words, a user may use an online service by using the user terminal 101.

In operation 1701, the user terminal 101 may obtain user identification information based on user authentication information. Since details of operation 1701 correspond to those described above, descriptions thereof will not be provided again.

In operation 1703, the user terminal 101 may transmit a temporary account information generation request message to the account server 103. Since details of operation 1703 correspond to those described above, descriptions thereof will not be provided again.

In operation 1705, the account server 103 may generate temporary account information. Since details of operation 1705 correspond to those described above, descriptions thereof will not be provided again.

In operation 1707, the account server 103 may transmit the temporary account information to the user terminal 101. Since details of operation 1705 correspond to those described above, descriptions thereof will not be provided again.

In operation 1709, the user terminal 101 may transmit a service use request message by using the temporary account information. According to some embodiments, the user terminal 101 may transmit the service use request message to the service server 104 by using the temporary account information received from the account server 103. In other words, the user terminal 101 may include a service using device using a service.

In operation 1711, the service server 104 may transmit an account use request message to the account server 103. Since details of operation 1711 correspond to those described above, descriptions thereof will not be provided again.

In operation 1713, the account server 103 may provide service account information to the service server 104. Since details of operation 1713 correspond to those described above, descriptions thereof will not be provided again.

In operation 1715, the service server 104 may approve service use. Since details of operation 1715 correspond to those described above, descriptions thereof will not be provided again.

Figure 18:
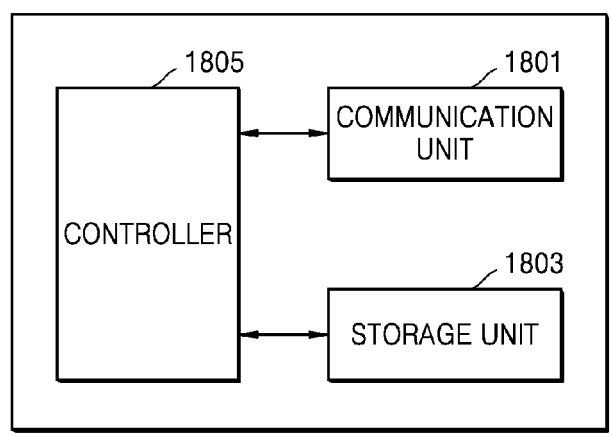
FIG. 18 is a block diagram of a structure of an account server, according to some embodiments.

FIG. 18 is a block diagram of a structure of an account server, according to some embodiments.

As shown in FIG. 18, the account server 103 according to some embodiments may include a communication unit 1801, a storage unit 1803, and a controller 1805. However, not all components shown in FIG. 18 are essential components of the account server 103. The account server 103 may include more components than those shown in FIG. 18, or less components than those shown in FIG. 18.

According to some embodiments, the communication unit 1801 may receive a temporary account generation request message from a user terminal, and transmit temporary account information generated by the controller 1805. Also, the communication unit 1801 may receive an account use request message from a service using device, and transmit service account information corresponding to received account information and service identification information, to the service using device.

According to some embodiments, the communication unit 1801 may obtain second account information from the user terminal. In addition, the communication unit 1801 may transmit account use confirmation request message to the user terminal, based on account use request message received from the service using device, and receive an account use confirmation response message from the user terminal.

Also, according to some embodiments, the communication unit 1801 may receive an account information register request message from the user terminal, and obtain at least one piece of service account information corresponding to at least one service, based on at least one piece of account information included in the account information register request message.

According to some embodiments, the storage unit 1803 may store temporary account information generated by the controller 1805. Also, the storage unit 1803 may store the service account information. In addition, the storage unit 1803 may store, as one group, at least one piece of service account information.

According to some embodiments, the controller 1805 generally controls overall operations of the account server 103. For example, the controller 1805 may execute a program stored in the account server 103 to generally control components included in the account server 103. Also, the controller 1805 may include at least one processor.

According to some embodiments, the controller 1805 may generate temporary account information, based on user identification information, and identify temporary account information and service identification information included in the account use request message received from the service server 104. The controller 1805 may determine a length of first account information to be generated, generate a random number corresponding to the determined length, when converting the generated random number to a character string by using an ASCII code, determine whether the character string includes a character string that is not recognizable by a user, and generate temporary account information based on a result of the determination.

According to some embodiments, the controller 1805 may authenticate the user based on the user identification information, and generate the temporary account information based on a result of the authentication. The length of the temporary account information may be determined based on a type of the user identification information.

Also, according to some embodiments, the controller 1805 may determine whether to transmit service account information to the service server 104, based on a response to the account use confirmation request message received from the user terminal.

In addition, according to some embodiments, the controller 1805 may delete the generated temporary account information after a certain period of time has passed or based on the number of times the account use request message is received from the service using device.

Figure 19:
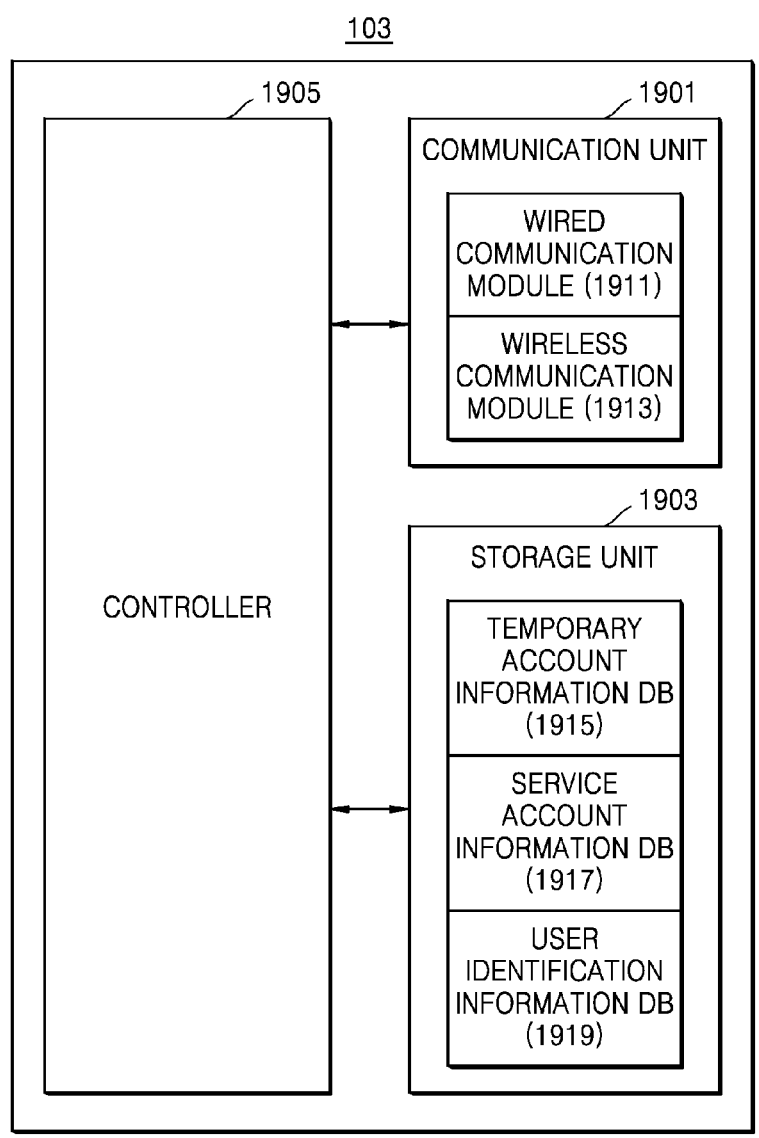
FIG. 19 is a detailed block diagram of a structure of an account server, according to some embodiments.

FIG. 19 is a detailed block diagram of a structure of an account server, according to some embodiments.

As shown in FIG. 19, the account server 103 according to some embodiments may include a communication unit 1901, a storage unit 1903, and a controller 1905. However, not all components shown in FIG. 19 are essential components of the account server 103. The account server 103 may include more components than those shown in FIG. 19, or less components than those shown in FIG. 19. Also, the communication unit 1901, the storage unit 1903, and the controller 1905 of FIG. 19 may respectively correspond to those of FIG. 18.

As shown in FIG. 19, the communication unit 1901 may include a wired communication module 1911 and a wireless communication module 1913, and the storage unit 1903 may include a temporary account information database (DB) 1915, a service account information DB 1917, and a user identification information DB 1919.

According to some embodiments, the wired communication module 1911 and the wireless communication module 1913 may respectively perform wired communication and wireless communication. A wireless communication method may include a short-range wireless communication method and a mobile communication method.

According to some embodiments, the temporary account information DB 1915 may store generated temporary account information. Also, temporary account information stored in the temporary account information DB 1915 may be deleted according to control of the controller 1905.

According to some embodiments, the service account information DB 1917 may store service account information. There may be at least one piece of service account information for each user, and pieces of service account information may be stored according to groups.

According to some embodiments, the user identification information DB 1919 may store user identification information. The user identification information may be received from a user terminal or obtained by the controller 1905, based on user authentication information.

Figure 20:
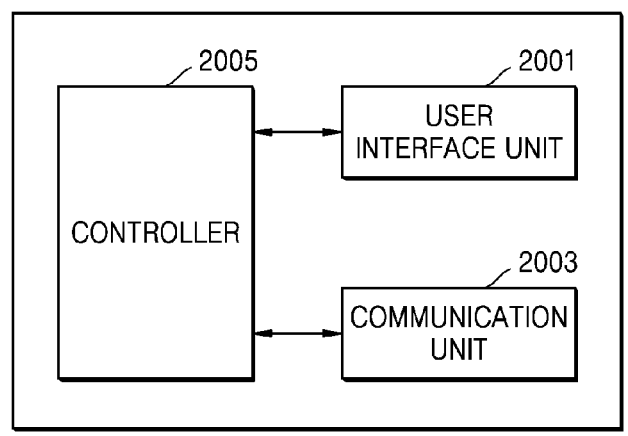
FIG. 20 is a block diagram of a structure of a user terminal, according to some embodiments.

FIG. 20 is a block diagram of a structure of a user terminal, according to some embodiments.

As shown in FIG. 20, the user terminal 101 according to some embodiments may include a UI unit 2001, a communication unit 2003, and a controller 2005. However, not all components shown in FIG. 20 are essential components of the user terminal 101. The user terminal 101 may include more components than those shown in FIG. 20, or less components than those shown in FIG. 20.

According to some embodiments, the UI unit 2001 may obtain user authentication information. Also, according to some embodiments, the UI unit 2001 may receive various user inputs.

According to some embodiments, the communication unit 2003 may transmit an account generation request message including user identification information to an account server. Also, the communication unit 2003 may receive temporary account information generated by the account server, and provide the received temporary account information to a service using device or a service server.

According to some embodiments, the communication unit 2003 may transmit the temporary account information to the service using device or the service server by using short-range wireless communication.

According to some embodiments, the controller 2005 generally controls overall operations of the user terminal 101. For example, the controller 205 may execute a program stored in the user terminal 101 to generally control components included in the user terminal 101. Also, the controller 2005 may include at least one processor.

According to some embodiments, the controller 2005 may obtain user identification information, based on the obtained user authentication information. Also, the controller 2005 may determine whether to transmit a response to an account use request message, to the account server, based on a user input.

Figure 21:
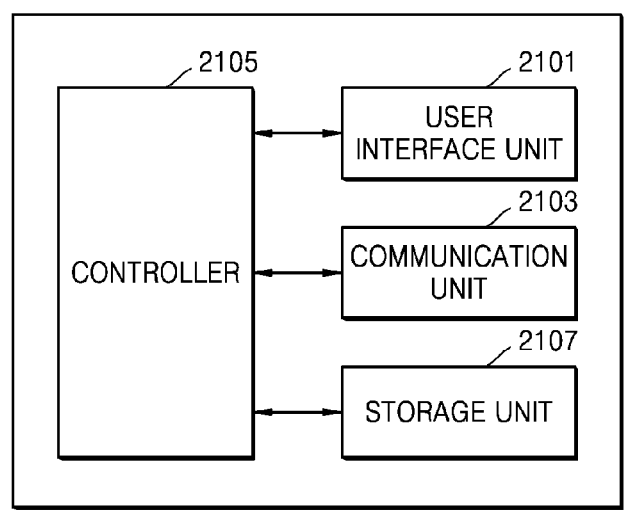
FIGS. 21 and 22 are detailed block diagrams of a structure of a user terminal, according to some embodiments.
Figure 22:
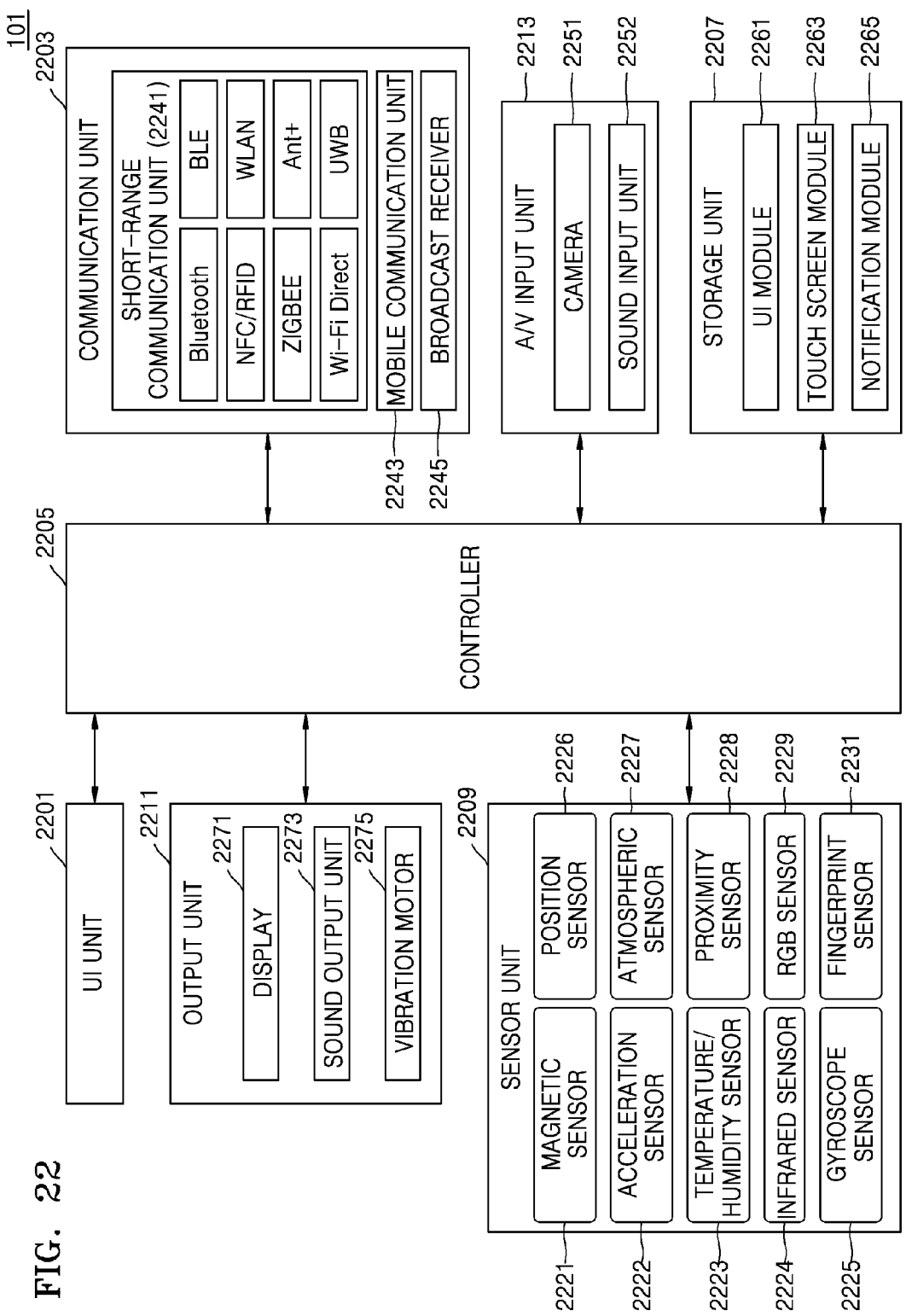

FIGS. 21 and 22 are detailed block diagrams of a structure of a user terminal, according to some embodiments.

As shown in FIG. 21, the user terminal 101 according to some embodiments may include a UI unit 2101, a communication unit 2103, a controller 2105, and a storage unit 2107. However, not all components shown in FIG. 21 are essential components of the user terminal 101. The user terminal 101 may include more components than those shown in FIG. 21, or less components than those shown in FIG. 21. Also, the UI unit 2101, the communication unit 2103, and the controller 2105 of FIG. 21 may correspond to those of FIG. 20.

Since details of the UI unit 2101, communication unit 2103, and controller 2105 correspond to those of FIG. 20, descriptions thereof will not be provided again.

According to some embodiments, the storage unit 2107 may store user identification information, and store received temporary account information. Also, according to some embodiments, the storage unit 2107 may store authentication standard information used to authenticate a user based on obtained user authentication information. For example, the storage unit 2107 may store reference fingerprint information used to determine whether obtained fingerprint information is fingerprint information of a user having proper authorization to use the user terminal 101.

As shown in FIG. 22, the user terminal 101 according to some embodiments may include a UI unit 2201, a communication unit 2203, a controller 2205, a storage unit 2207, a sensor unit 2209, an output unit 2211, and an A/V input unit 2213. However, not all components shown in FIG. 22 are essential components of the user terminal 101. The user terminal 101 may include more components than those shown in FIG. 22, or less components than those shown in FIG. 22. Also, the UI unit 2201, the communication unit 2203, the controller 2205, and the storage unit 2207 of FIG. 22 may correspond to those of FIG. 21.

According to some embodiments, the UI unit 2201 denotes a unit into which a user inputs data for controlling the user terminal 101. For example, the UI unit 2201 may include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

According to some embodiments, the output unit 2211 may output an audio signal, a video signal, or a vibration signal, and may include a display 2271, a sound output unit 2273, and a vibration motor 2275.

According to some embodiments, the display 2271 may output GUI. For example, the display 2271 may output GUI for selecting a method of transmitting temporary account information to the service using device 102.

Meanwhile, when the display 2271 is configured as a touch screen by forming a layer structure with a touch pad, the display 2271 may be used as an input device as well as an output device. The display 2271 may include at least one of a liquid crystal display (LCD), a thin-film-transistor liquid-crystal display (TFT-LCD), an organic light-emitting diode (OLED), a flexible display, a 3D display, and an electrophoretic display. Also, according to an embodiment of the user terminal 101, the user terminal 101 may include at least two displays 2271. In this case, the at least two displays 2271 may be provided to face each other by using a hinge.

The sound output unit 2273 outputs audio data received from the communication unit 2203 or stored in the storage unit 2207 (a memory). Also, the sound output unit 2273 outputs a sound signal related to a function (for example, a call signal reception sound, a message reception sound, or an alarm sound) performed by the user terminal 101. The sound output unit 2273 may include a speaker or a buzzer.

The vibration motor 2275 may output a vibration signal. For example, the vibration motor 2275 may output a vibration signal corresponding to an output of audio data or video data. Also, the vibration motor 2275 may output a vibration signal when a touch screen is touched.

According to some embodiments, the sensor unit 2209 may detect a state of the user terminal 101 or a state around the user terminal 101, and transmit the detected state to the controller 2205.

The sensor unit 2209 may include at least one of a magnetic sensor 2221, an acceleration sensor 2222, a temperature/humidity sensor 2223, an infrared sensor 2224, a gyroscope sensor 2225, a position sensor 2226 (for example, a global positioning system (GPS)), an atmospheric sensor 2227, a proximity sensor 2228, a red, green, blue (RGB) sensor 2229, and a fingerprint sensor 2231, but is not limited thereto. Because functions of each sensor may be intuitively inferred by one of ordinary skill in the art based on its name, details thereof are not described herein.

According to some embodiments, the communication unit 2203 may include a short-range communication unit 2241, a mobile communication unit 2243, and a broadcast receiver 2245. The short-range communication unit 2241 may include a Bluetooth communication unit, a Bluetooth low energy (BLE) communication unit, a near-field communication (NFC) unit, a wireless local area network (WLAN) (Wi-Fi) communication unit, a Zigbee communication unit, an infrared data association (IrDA) communication unit, a Wi-Fi direct (WFD) communication unit, an ultra-wideband (UWB) communication unit, and an Ant+ communication unit, but is not limited thereto. Also, each communication unit included in the short-range communication unit 2241 may include a transmitter and a receiver.

According to some embodiments, the mobile communication unit 2243 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiver 2245 receives a broadcast signal and/or broadcast related information from an external source, through a broadcast channel The broadcast channel may include a satellite channel or a terrestrial broadcasting channel According to an embodiment, the user terminal 101 may not include the broadcast receiver 2245.

The A/V input unit 2213 receives an audio signal or a video signal, and may include a camera 2251 and a sound input unit 2252. The camera 2251 may obtain an image frame of a still image or a moving image via an image sensor in a video telephone mode or a photographing mode. Also, the camera 2251 may obtain information such as an iris image or a face image, from user authentication information, but is not limited thereto. An image captured via the image sensor may be processed by the controller 2205 or a separate image processor (not shown).

An image frame processed by the camera 2251 may be stored in the storage unit 2207 (memory) or externally transmitted through the communication unit 2203. According to an embodiment of a terminal, there may be at least two cameras 2251.

The sound input unit 2252 receives an external sound signal and processes the external sound signal to electric voice data. For example, the sound input unit 2252 may be a microphone, but is not limited thereto. The sound input unit 2252 may receive a sound signal from an external device, a server, or a user. The sound input unit 2252 may use any one of various noise removing algorithms to remove noise generated while receiving the external sound signal. Also, according to some embodiments, the sound input unit 2252 may obtain voice information from user authentication information, but is not limited thereto.

According to some embodiments, the storage unit 2207 (memory) may store programs for processes and controls of the controller 2205, and may store data input to or output from the user terminal 101.

According to some embodiments, the storage unit 2207 (memory) may include at least one type of storage medium from among a flash memory, a hard disk, a multimedia card micro-type memory, a card-type memory (for example, a secure digital (SD) card or an extreme digital (XD) card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Also, according to some embodiments, programs stored in the storage unit 2207 (memory) may be classified into a plurality of modules based on functions, and for example, may be classified into a UI module 2261, a touch screen module 2263, and a notification module 2265.

The UI module 2261 may provide a specialized UI or GUI linked to the user terminal 101.

The touch screen module 2263 may detect a touch gesture of a user on a touch screen, and transmit information about the touch gesture to the controller 2205. The touch screen module 2263 according to some embodiments may recognize and analyze a touch code. The touch screen module 2263 may be configured as separate hardware including a controller.

Various sensors may be disposed inside or around the touch screen to detect a touch or a proximity touch on the touch screen. An example of a sensor for detecting a touch on the touch screen includes a tactile sensor. The tactile sensor detects contact that can be felt by a person on a certain object. The tactile sensor may detect various types of information, such as roughness of a contact surface, rigidness of a contact object, and temperature of a touch point.

Also, an example of a sensor for detecting a touch on the touch screen includes a proximity sensor.

The proximity sensor detects existence of an object approaching or near a predetermined detection surface by using an electromagnetic field force or infrared ray, without having to detect a mechanical contact. Examples of the proximity sensor include a transmission photoelectric sensor, a direct reflective-type photoelectric sensor, a mirror reflective-type photoelectric sensor, a high-frequency oscillation proximity sensor, a capacitance-type proximity sensor, a magnetic-type proximity sensor, and an infrared proximity sensor. Examples of a touch gesture of a user include tap, touch and hold, double-tap, drag, panning, flick, drag-and-drop, and swipe.

The notification module 2265 may generate a signal for notifying event generation in the user terminal 101. Examples of an event generated in the user terminal 101 include call signal reception, message reception, key signal input, and schedule notification. The notification module 2265 may output a notification signal in a video signal format through the display 2271, in an audio signal format through the sound output unit 2273, or in a vibration signal format through the vibration motor 2275.

The device described herein may include a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A method of providing, by a server, account information, the method comprising:
   receiving, by the server, an account generation request message from a first device;
   generating, by the server, first account information, based on user identification information included in the account generation request message;
   transmitting, by the server, the generated first account information to the first device;
   receiving, by the server, an account use request message from a second device;
   identifying, by the server, the first account information and service identification information for identifying a service provider included in the received account use request message, the first account information transmitted to the first device being provided to the second device;
   transmitting an account use confirmation request message to the first device, based on the received account use request message;
   receiving an account use confirmation response message from the first device; and
   selectively transmitting, by the server, second account information corresponding to the identified first account information and the service identification information for identifying the service provider, to the second device based on the account confirmation response message,
   wherein the second account information corresponds to account information of a user registered in the second device, and
   wherein the account information of the user registered in the second device comprises at least one of an identifier and a password for using a service provided by the second device, and a unique identifier used by the second device to identify a certain user.

2. The method of claim 1, wherein the user identification information comprises biometric information usable for user identification.

3. The method of claim 1, wherein a length of the first account information is determined based on a type of the user identification information.

4. The method of claim 1, wherein the generating of the first account information comprises:
authenticating a user, based on the user identification information; and
generating the first account information, based on a result of the authenticating.

5. The method of claim 1, further comprising:
obtaining the second account information; and
storing the obtained second account information,
wherein the transmitting of the second account information comprises transmitting the stored second account information.

6. The method of claim 1, further comprising deleting the generated first account information when a certain time has passed, or based on the number of times the account use request message is received from the second device.

7. The method of claim 5, wherein the obtaining of the second account information comprises:
receiving an account information register request message from the first device; and
obtaining at least one piece of second account information corresponding to at least one service, based on at least one piece of account information included in the account information register request message,
wherein the storing of the second account information comprises storing the at least one piece of second account information as one group.

8. A server for providing account information, the server comprising:
a transceiver;
at least one processor coupled to the transceiver and configured to:
control the transceiver to receive an account generation request message from a first device,
generate first account information, based on user identification information included in the account generation request message,
control the transceiver to transmit the generated first account information to the first device,
control the transceiver to receive an account use request message from a second device,
identify the first account information and service identification information for identifying a service provider included in the received account use request message, the first account information transmitted to the first device being provided to the second device,
transmit an account use confirmation request message to the first device, based on the received account use request message,
receive an account use confirmation response message from the first device, and
control the transceiver to selectively transmit second account information corresponding to the identified first account information and the service identification information for identifying the service provider, to the second device based on the account use confirmation response message; and
a storage unit configured to store the generated first account information,
wherein the second account information corresponds to account information of a user registered in the second device, and
wherein the account information of the user registered in the second device comprises at least one of an identifier and a password for using a service provided by the second device, and a unique identifier used by the second device to identify a certain user.

9. A non-transitory computer-readable recording medium having recorded thereon a program which, when executed by a computer, perform a method comprising:
receiving an account generation request message from a first device;
generating first account information, based on user identification information included in the account generation request message;
transmitting the generated first account information to the first device;
receiving an account use request message from a second device;
identifying the first account information and service identification information for identifying a service provider included in the received account use request message, the first account information transmitted to the first device being provided to the second device;
transmitting an account use confirmation request message to the first device, based on the received account use request message;
receiving an account use confirmation response message from the first device; and
selectively transmitting second account information corresponding to the identified first account information and the service identification information for identifying the service provider, to the second device based on the account confirmation response message,
wherein the second account information corresponds to account information of a user registered in the second device, and
wherein the account information of the user registered in the second device comprises at least one of an identifier and a password for using a service provided by the second device, and a unique identifier used by the second device to identify a certain user.

* * * * *